US012801971B2

(12) United States Patent
Majumdar et al.

(10) Patent No.: US 12,801,971 B2
(45) Date of Patent: Nov. 17, 2026

(54) QUANTUM ERROR MITIGATION FOR PROBABILITY DISTRIBUTIONS

(71) Applicant: International Business Machines Corporation, Armonk, NY (US)

(72) Inventors: Ritajit Majumdar, Kolkata (IN); Pedro Rivero Ramirez, Long Island City, NY (US); Swarnadeep Majumder, Durham, NC (US); Zlatko Kristev Minev, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

(21) Appl. No.: 18/910,520

(22) Filed: Oct. 9, 2024

(65) Prior Publication Data

US 2026/0099753 A1 Apr. 9, 2026

(51) Int. Cl.
*G06N 10/70* (2022.01)

(52) U.S. Cl.
CPC .................................... *G06N 10/70* (2022.01)

(58) Field of Classification Search
CPC ...................................................... G06N 10/70
See application file for complete search history.

(56) References Cited

U.S. PATENT DOCUMENTS 9,495,644 B2 11/2016 Ariel et al.
2015/0032994 A1 1/2015 Chudak et al.
2021/0099201 A1 4/2021 Winick et al.
2021/0391873 A1 12/2021 Zheng et al.
2022/0029639 A1 * 1/2022 McClean .............. G06N 10/70
(Continued)

FOREIGN PATENT DOCUMENTS

CN 115222054 A 10/2022
CN 115271083 B * 5/2023 ............ G06N 10/70
CN 116310473 A 6/2023
CN 116685982 A 9/2023
CN 117474108 A 1/2024
CN 117474111 A 1/2024
WO 2024025672 A2 2/2024

OTHER PUBLICATIONS

Chien, Riley W., et al. "Simulating quantum error mitigation in fermionic encodings." arXiv preprint arXiv:2303.02270 (2023). (Year: 2023).*

(Continued)

*Primary Examiner* — Mark D Featherstone
*Assistant Examiner* — Jeffrey Andrew Yang
(74) *Attorney, Agent, or Firm* — Amin, Turocy & Watson, LLP

(57) ABSTRACT

One or more systems, devices, computer program products and/or computer-implemented methods for determining error mitigated probability distributions are provided. A system can comprise a memory that can store computer-executable components. The system can further comprise a processor that executes at least one of the computer executable components that can execute a plurality of shots of a quantum circuit to obtain noise probabilities of observables; obtain a probability distribution of the noise probabilities; determine, using the probability distribution, expectation values of the observables; perform error mitigation on the expectation values to obtain an error mitigated probability distribution; and transform the error mitigated expectation values into an error mitigated probability distribution.

20 Claims, 20 Drawing Sheets

(56) References Cited

U.S. PATENT DOCUMENTS

| | | | | |
|---|---|---|---|---|
| 2023/0072535 | A1 | 3/2023 | Upadhyay | |
| 2023/0177377 | A1* | 6/2023 | Oh | G06N 7/01 716/100 |
| 2023/0290566 | A1* | 9/2023 | Negri | H01F 27/027 |
| 2023/0306294 | A1 | 9/2023 | Wang et al. | |

OTHER PUBLICATIONS

International Searching Authority, "Notification of Transmittal of the International Search Report and the Written Opinion of the International Searching Authority, or the Declaration", International Application No. PCT/EP2025/078316, Mar. 13, 2026, 14 pages.
Barron et al., "Provable bounds for noise-free expectation values computed from noisy samples," Submitted on Dec 1, 2023, https://doi.org/10.48550/arXiv.2312.00733.
Robledo-Moreno et al., "Chemistry Beyond Exact Solutions on a Quantum-Centric Supercomputer," Submitted on May 8, 2024, https://doi.org/10.48550/arXiv.2405.05068.
Cai et al., "Quantum Error Mitigation," Published Oct. 4, 2022, http://dx.doi.org/10.48550/arXiv.2210.00921.
Minev, Zlatko "Tech Note T21: Estimating observables from sampled bit strings" https://www.zlatko-minev.com/blog/t21-bit-strings, Last Accessed Oct. 2, 2024, 2 pages.
Taiwan Patent Office, "Office Action," Jul. 22, 2026, 24 Pages, TW Application No. 114135604.

* cited by examiner

QUANTUM ERROR MITIGATION FOR PROBABILITY DISTRIBUTIONS

BACKGROUND

The subject disclosure relates to quantum error mitigation, and more specifically to quantum error mitigation for probability distributions.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable quantum error mitigation for probability distributions are discussed.

According to an embodiment, a system is provided. The system can comprise a memory that can store computer-executable components. The system can further comprise a processor that can execute at least one of the computer executable components that can execute a plurality of shots of a quantum circuit to obtain noise probabilities of observables. The at least one of the computer executable components can further obtain a probability distribution of the noise probabilities. The at least one of the computer executable components can further determine, using the probability distribution, expectation values of the observables. The at least one of the computer executable components can further perform error mitigation on the expectation values to obtain error mitigated expectation values. The at least one of the computer executable components can further transform the error mitigated expectation values into an error mitigated probability distribution.

According to an embodiment, a computer-implemented method is provided. The computer-implemented method can comprise executing, by a system operatively coupled to a processor, a plurality of shots of a quantum circuit to obtain noise probabilities of observables. The computer-implemented method can further comprise obtaining, by the system, a probability distribution of the noise probabilities. The computer-implemented method can further comprise determining, by the system and using the probability distribution, expectation values of the observables. The computer-implemented method can further comprise performing, by the system, error mitigation on the expectation values to obtain error mitigated expectation values. The computer-implemented method can further comprise transforming, by the system, the error mitigated expectation values into an error mitigated probability distribution.

According to an embodiment, a computer program product for determining error mitigated probability distributions is provided. The computer program product can comprise a computer readable storage medium having program instructions embodied therewith, the program instructions executable by a processor to cause the processor to execute a plurality of shots of a quantum circuit to obtain noise probabilities of observables. The program instructions executable by the processor can further cause the processor to obtain a probability distribution of the noise probabilities. The program instructions executable by the processor can further cause the processor to determine, using the probability distribution, expectation values of the observables. The program instructions executable by the processor can further cause the processor to perform error mitigation on the expectation values to obtain error mitigated expectation values. The program instructions executable by the processor can further cause the processor to transform the error mitigated expectation values into an error mitigated probability distribution.

BRIEF DESCRIPTION OF THE DRAWINGS

One or more embodiments are described below in the Detailed Description section with reference to the following drawings.

DETAILED DESCRIPTION

Figure 1:
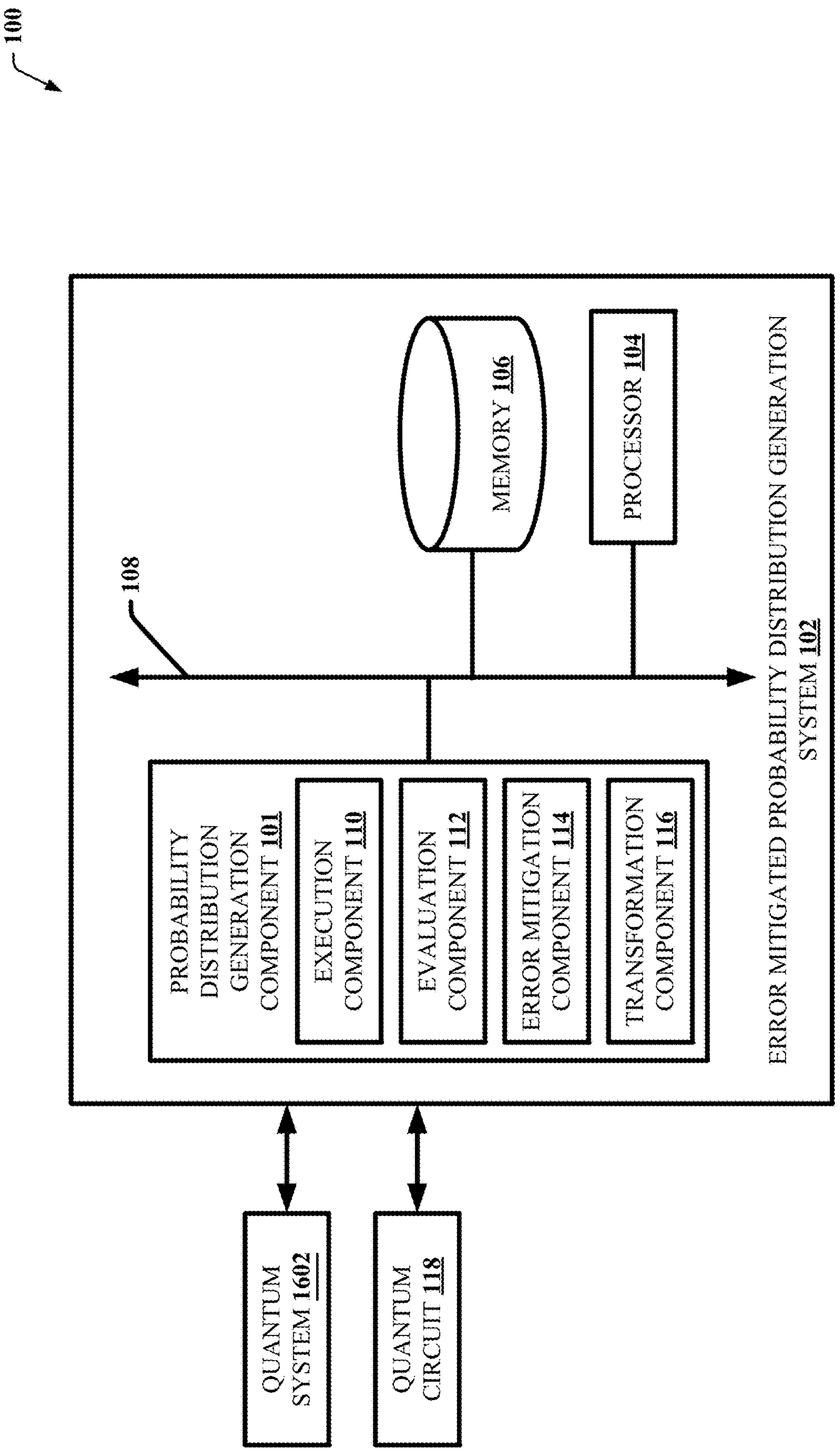
FIG. 1 illustrates a block diagram of an example, non-limiting system that can facilitate quantum error mitigation for probability distributions in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

According to an embodiment, a system is provided. The system can comprise a memory that can store computer-executable components. The system can further comprise a processor that can execute at least one of the computer executable components that can execute a plurality of shots of a quantum circuit to obtain noise probabilities of observables. The at least one of the computer executable components can further obtain a probability distribution of the noise probabilities. The at least one of the computer executable components can further determine, using the probability distribution, expectation values of the observables. The at least one of the computer executable components can further perform error mitigation on the expectation values to obtain error mitigated expectation values. The at least one of the computer executable components can further transform the error mitigated expectation values into an error mitigated probability distribution. Such embodiments of the system can provide a number of advantages, including enabling determination of an error mitigated probability distribution, improving accuracy of quantum error mitigation, improving scalability of quantum error mitigation, and reducing additional classical and quantum overhead for determining the error mitigated probability distribution.

In some embodiments of the aforementioned system, the at least one of the computer executable components can further: perform a Walsh-Hadamard transformation on the error mitigated expectation values. Such embodiments of the system provide the advantage of dynamic computation enabling scalability of quantum error mitigation.

In one or more embodiments of the aforementioned system, the at least one of the computer executable components can further: perform an inverse of the Walsh-Hadamard transformation on the error mitigated expectation values. Such embodiments of the system provide the advantage of dynamic computation enabling scalability of quantum error mitigation.

In various embodiments of the aforementioned system, the at least one of the computer executable components can further: truncates the expectation values to obtain an approximation of the noise probabilities. Such embodiments of the system provide the advantages of improving scalability of quantum error mitigation by reducing the number of expectation values to error mitigate.

In some embodiments of the aforementioned system, the at least one of the computer executable components can further: form a cyclic group with the observables that have a weight of zero or a weight of one as generators. Such embodiments of the system provide the advantage of improving scalability of quantum error mitigation by reducing the number of expectation values to error mitigate.

In one or more embodiments of the aforementioned system, the at least one of the computer executable components can further: determine error mitigated expectation values of the generators; and determine the expectation values of the observables that are not generators from the generators. Such embodiments of the system provide the advantage of improving scalability of quantum error mitigation by reducing the number of expectation values to error mitigate.

In one or more embodiments of the aforementioned system, the at least one of the computer executable components can further: truncate the expectation values of the observables that have a weight larger than a threshold parameter. Such embodiments of the system provide the advantage of improving scalability of quantum error mitigation by reducing the number of expectation values to error mitigate.

In one or more embodiments of the aforementioned system, the at least one of the computer executable components can further: truncate the expectation values of the observables that have a smaller magnitude than a threshold parameter to zero. Such embodiments of the system provide the advantages of improving scalability of quantum error mitigation by reducing the number of expectation values to error mitigate.

According to some embodiments, the above-described computer system can be implemented as a computer-implemented method or as a computer program product.

Quantum error mitigation is a set of techniques used to reduce the impact of errors that occur in quantum computing algorithms. These errors arise from inherent instabilities of quantum systems, which can lead to inaccuracies in the results produced by quantum computers. For example, errors can result from decoherence errors, gate imperfections, crosstalk, or measurement inaccuracies. Quantum error mitigation can address the impact of these errors by post-processing measurement data and adjusting the results to mitigate the effects of the noise. For instance, executing multiple noisy quantum circuits can yield noisy measurement outcomes of observables. Quantum error mitigation methods then use these noisy measurement outcomes to estimate the noiseless expectation values (e.g., error mitigates expectation values). For example, techniques involved in quantum error mitigation include zero-noise extrapolation (ZNE), probabilistic error cancellation (PEC), probabilistic error amplification (PEA), Clifford data regression (CDR), measurement error mitigation, unitary folding, or virtual distillation.

In any case, many problems in various domains can benefit from or require obtaining a probability distribution. For instance, in Grover's algorithm, the probability distribution of measurement outcomes is crucial because it determines the success of finding the correct solution to a search problem. However, in noisy quantum systems, noise can significantly distort the true distribution, obscuring the amplification of the correct solution. This leads to inaccurate estimates of the target state's probability and reduces the algorithm's overall effectiveness. As another example, in Hamiltonian simulation problems, probability distributions are needed to accurately estimate the expectation value of the Hamiltonian. Unfortunately, noise can distort the probability distribution of measurement outcomes, which can obscure the accurate estimation of the Hamiltonian's expectation value and lead to erroneous results in simulations of quantum systems. As yet another example, in optimization problems, probability distributions are essential for evaluating the distribution of possible solutions and their likelihoods. Accurate distributions help in identifying the optimal solution by reflecting the true probability of various candidate solutions, thus improving the effectiveness of quantum optimization algorithms. However, noise that distorts the probability distribution of measurement outcomes can obscure the true distribution of possible solutions, leading to inaccurate assessments of the optimal solution and reducing the effectiveness of quantum optimization algorithms. In any case, probability distributions provide a complete picture of the measurement outcomes, capturing not only the average behavior (expectation values) but also the spread and variability of results. This comprehensive view is essential for analyzing the impact of noise and errors, which enables the construction of error models and the application of effective correction techniques in quantum error mitigation. Thus, an accurate and efficient method for obtaining an error mitigated probability distribution at low classical and quantum overhead costs can be desirable.

Various embodiments of the present disclosure can be implemented to produce a solution to one or more of the problems discussed above. Embodiments described herein include systems, computer-implemented methods, and computer program products that can enable quantum error mitigation for probability distributions. In various embodiments, a quantum circuit can be executed a plurality of times (e.g., execute a plurality of shots of the quantum circuit). In various embodiments, noise probabilities of observables can be obtained from executing the quantum circuit a plurality of times. From the noise probabilities, in various embodiments, a probability distribution can be obtained. The probability distribution obtained from the noise probabilities can be considered a noisy probability distribution (e.g., is not error mitigated and includes effects from errors). In various embodiments, using the probability distribution, expectation values of the observables can be determined. Furthermore, in various aspects, error mitigation can be performed on the expectation values to obtain error mitigated expectation values. Any method of error mitigation can be performed to obtain the error mitigated expectation values, such as ZNE or PEC. No matter the method of error mitigation applied, in various embodiments, a transformation can be applied to the error mitigated expectation values to obtain an error mitigated probability distribution. For instance, a Walsh-Hadamard transformation can be applied to the error mitigated expectation values to determine the error mitigated probability distribution. In any case, the error mitigated probability distribution can be considered error mitigated because the probability distribution is closer to the true distribution (e.g., ideal distribution) than the noisy probability distribution. In various instances, normalization can be applied to the error mitigated probability distribution.

Figure 16:
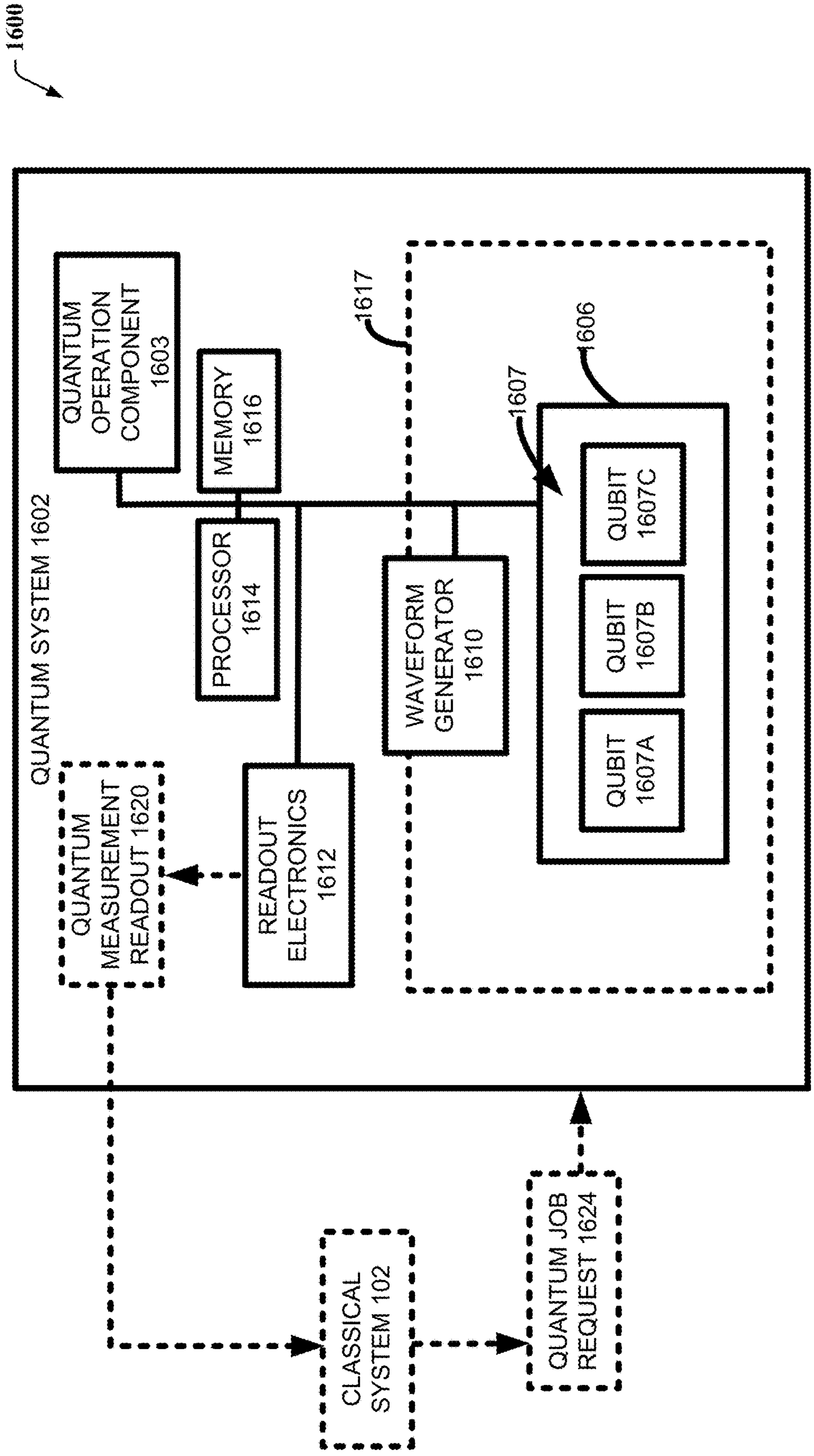
FIG. 16 illustrates a block diagram of an example, non-limiting quantum system that can at least partially facilitate quantum error mitigation for probability distributions in accordance with one or more embodiments described herein.

FIG. 1 illustrates a block diagram of an example, non-limiting system 100 that can facilitate quantum error mitigation for probability distributions in accordance with one or more embodiments described herein. That is, the non-limiting system 100 can facilitate quantum error mitigation for probability distributions, in combination with employment of a quantum system 1602 (FIG. 16). Aspects of systems (e.g., error mitigated probability distribution generation system 102 and the like), apparatuses or processes in various embodiments of the present invention, can constitute one or more machine-executable components embodied within one or more machines (e.g., embodied in one or more computer readable mediums (or media) associated with one or more machines). Such components, when executed by the one or more machines (e.g., computers, computing devices, virtual machines, etc.), can cause the machines to perform the operations described. System 102 can comprise probability distribution generation component 101, processor 104, memory 106, system bus 108, execution component 110, evaluation component 112, error mitigation component 114, and/or transformation component 116.

The system 100 and/or the components of system 100 can be employed to use hardware and/or software to solve problems that are highly technical in nature (e.g., related to quantum computing, quantum error mitigation, quantum error mitigated probability distributions, etc.), that are not abstract and that cannot be performed as a set of mental acts by a human. Further, some of the processes performed may be performed by specialized computers for carrying out defined tasks related to error mitigating probability distributions. The system 100 and/or components of the system can be employed to solve new problems that arise through advancements in technologies mentioned above, quantum computing, and/or the like. The system 100 can provide technical improvements in terms of achieving more accurate probability distributions for quantum error mitigation, improving scalability of quantum error mitigation, and improving computational efficiency of obtaining error mitigated probability distributions, etc.

Discussion turns briefly to processor 104, memory 106 and bus 108 of system 100. For example, in one or more embodiments, the system 100 can comprise processor 104 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 104 to enable performance of one or more processes defined by such component(s) and/or instruction(s).

In one or more embodiments, system 100 can comprise a computer-readable memory (e.g., memory 106) that can be operably connected to the processor 104. Memory 106 can store computer-executable instructions that, upon execution by processor 104, can cause processor 104 and/or one or more other components of system 100 (e.g., probability distribution generation component 101, execution component 110, evaluation component 112, error mitigation component 114, and/or transformation component 116) to perform one or more actions. In one or more embodiments, memory 106 can store computer-executable components (e.g., probability distribution generation component 101, execution component 110, evaluation component 112, error mitigation component 114, and/or transformation component 116).

System 100 and/or a component thereof as described herein, can be communicatively, electrically, operatively, optically and/or otherwise coupled to one another via bus 108. Bus 108 can comprise one or more of a memory bus, memory controller, peripheral bus, external bus, local bus, and/or another type of bus that can employ one or more bus architectures. One or more of these examples of bus 108 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor 104 and/or memory 106 described above, system 100 can comprise one or more computer and/or machine readable, writable and/or executable components and/or instructions that, when executed by processor 104, can enable performance of one or more operations defined by such component(s) and/or instruction (s).

In various embodiments, system 100 can receive a quantum circuit 118, and execution component 110 can execute the quantum circuit 118 on a quantum processor (e.g. processor 1614). In various aspects, execution component 110 can execute the quantum circuit 118 on the quantum processor any suitable number of times (e.g., execute 1000 shots, execute 100 shots). For instance, execution component 110 can execute the quantum circuit 118 N times for any suitable positive integer N>1. In various cases, quantum circuit 118 can comprise n qubits for any suitable positive integer n>1. In various instances, there can be more than one of quantum circuit 118, wherein each quantum circuit can differ. Accordingly, execution component 110 can execute more than one of quantum circuit 118.

In various embodiments, executing the quantum circuit 118 can result in measurement outcomes of observables. In various aspects, there can be $2^n$ observables. For instance, the observables can be the set of $2^n$ different measurement operators, such as all possible combinations of Pauli operators applied to the n qubits, used to measure various aspects of a quantum state of the quantum system.

In various embodiments, based on frequencies of the measurement outcomes, the evaluation component 112 can obtain noise probabilities. Thus, in various embodiments, as described herein, evaluation component 112 can obtain a probability distribution of the noise probabilities. In any case, noise can be present in quantum circuit 118 due to errors introduced by quantum hardware (e.g., from the quantum processor). Accordingly, the probability distribution of the noise probabilities can be considered a noisy probability distribution.

In various embodiments, evaluation component 112 can, as described herein, determine expectation values of the observables using the probability distribution. For example, evaluation component 112 can determine the expectation values by summing products of each outcome's noise probability and a corresponding observables value, yielding an average measurement result for an observable, or the expectation value of the observable.

In various embodiments, error mitigation component 114 can, as described herein, perform error mitigation on the expectation values to obtain error mitigated expectation values. In various aspects, any suitable method of quantum error mitigation can be employed. For example, error mitigation component 114 can apply ZNE (e.g., method that runs the same algorithm multiple times with different levels of noise and then extrapolating the results to the ideal, noise-free case) to mitigate the expectation values. As another example, error mitigation component 114 can apply PEC (e.g., method that adds redundant qubits to the quantum circuit and uses probabilistic techniques to correct errors that may occur) to mitigate the expectation values.

In various embodiments, transformation component 116 can, as described herein, transform the error mitigated expectation values into an error mitigated probability distribution. In various instances, transformation component 116 can apply any suitable transformation to the error mitigated expectation values that yields a probability distribution from expectation values. For instance, transformation component 116 can apply a Walsh-Hadamard transformation to obtain the error mitigated probability distribution.

Figure 2:
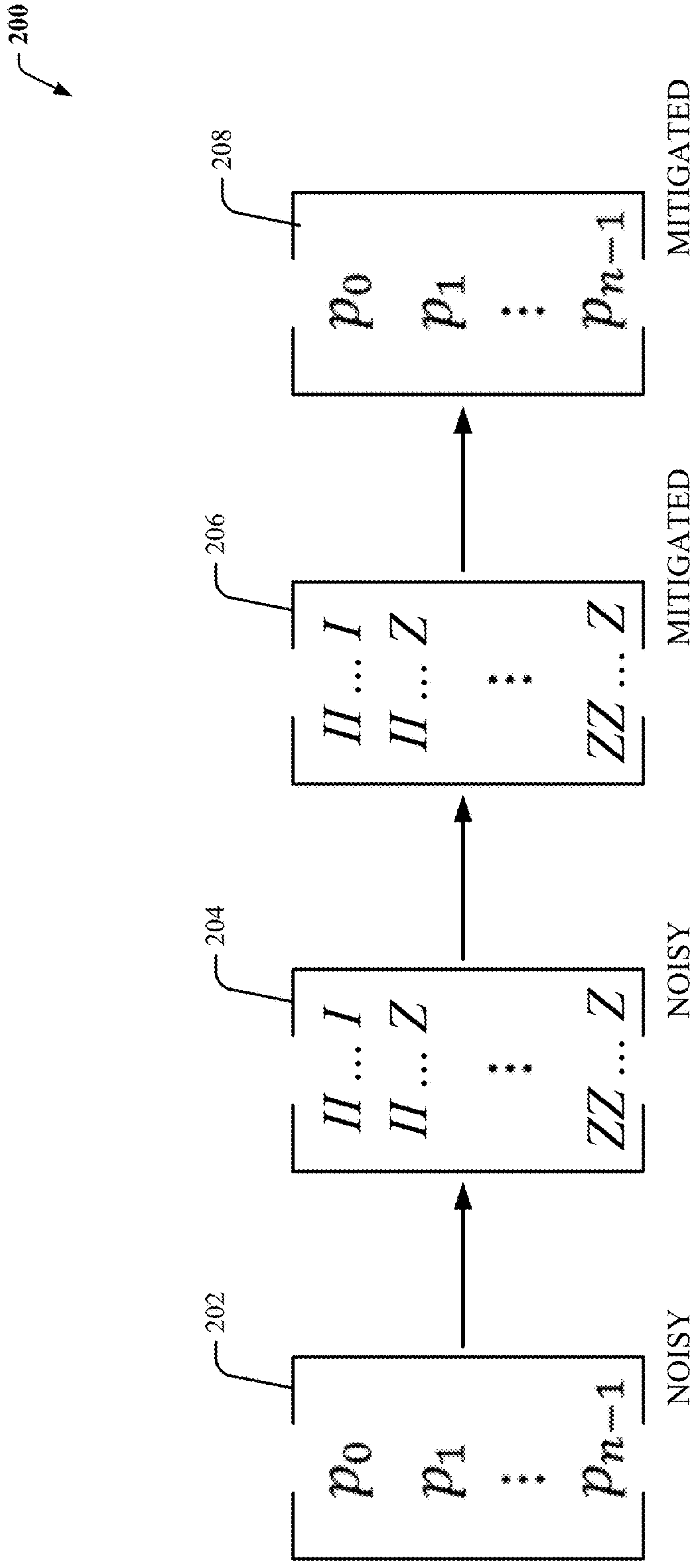
FIG. 2 illustrates an example, non-limiting diagram showing quantum error mitigation for probability distributions in accordance with one or more embodiments described herein.

FIG. 2 illustrates an example, non-limiting diagram 200 showing quantum error mitigation for probability distributions in accordance with one or more embodiments described herein.

In various embodiments, evaluation component 112 can obtain noise probabilities from executing the quantum circuit 118. For instance, evaluation component 112 can obtain noise probabilities $p_0, p_1, \ldots, p_{n-1}$ from executing the quantum circuit 118. Based on the noise probabilities, evaluation component 112 can determine a probability distribution 202 of the noise probabilities $p_0, p_1, \ldots, p_{n-1}$.

In various embodiments, evaluation component 112 can determine expectation values 204 (e.g., noisy expectation values, unmitigated expectation values) of the observables using the probability distribution 202.

In various embodiments, error mitigation component 114 can then perform error mitigation on the expectation values 204 to determine error mitigated expectation values 206. In various instances, any suitable method of quantum error mitigation can be performed.

In any case, in various embodiments, transformation component 116 can transform the error mitigated expectation values 206 into error mitigated noise distribution 208. That is, transformation component 116 can apply any suitable transformation on the error mitigated expectation values 206 that results in a probability distribution, and in particular, the error mitigated probability distribution 208. In various aspects, the noise probabilities $p_0, p_1, \ldots, p_{n-1}$ of the error mitigated probability distribution can then be considered as error mitigated.

Figure 3:
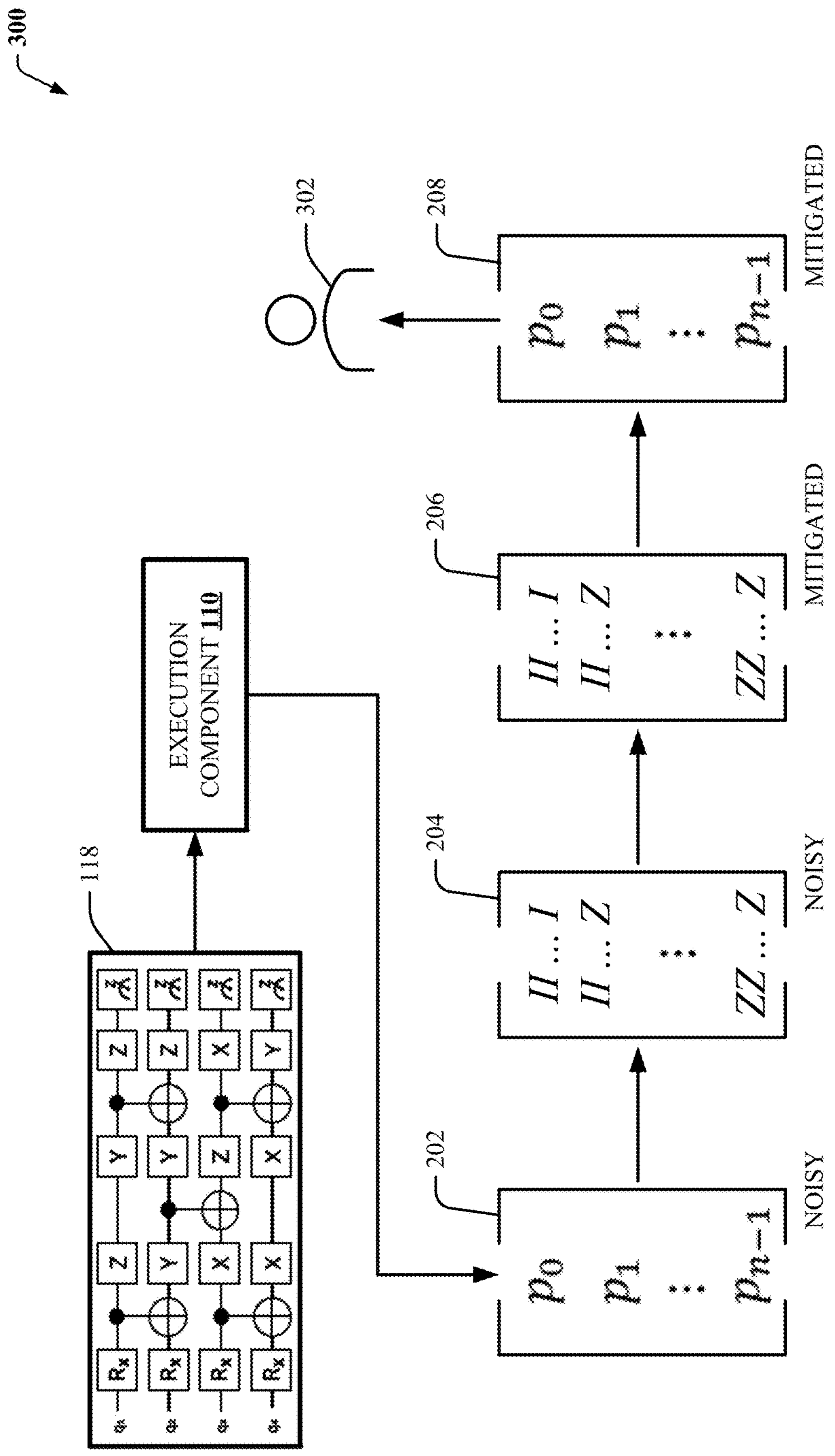
FIG. 3 illustrates an example, non-limiting diagram showing quantum error mitigation for probability distributions in accordance with one or more embodiments described herein.

FIG. 3 illustrates an example, non-limiting diagram 300 showing quantum error mitigation for probability distributions in accordance with one or more embodiments described herein.

In various embodiments, execution component 110 can receive the quantum circuit 118 from an entity 302 (e.g., a user), where the quantum circuit 118 can represent a desired problem to solve by the entity 302. For instance, quantum circuit 118 can be configured for finding the ground state energy in Hamiltonian problems, identifying optimal solutions in combinatorial optimization, or searching for specific states in Grover's algorithm.

In any case, execution component 110 can execute the quantum circuit 118, and thus evaluation component 112 can obtain probability distribution 202 to determine expectation values 204. Then, error mitigation component 114 can perform error mitigation on the expectation values 204 to determine error mitigated expectation values 206, where transformation component 116 can generate the error mitigated probability distribution 208 by applying a transformation to the error mitigated expectation values 206. Upon generation of the error mitigated probability distribution 208, execution component 110 can, in various embodiments, output the error mitigated probability distribution 208 to the entity 302, thereby providing the entity 302 with more accurate data that accounts for noise and errors present during the quantum computation to solve the desired problem without high quantum or classical overhead costs.

Figure 4:
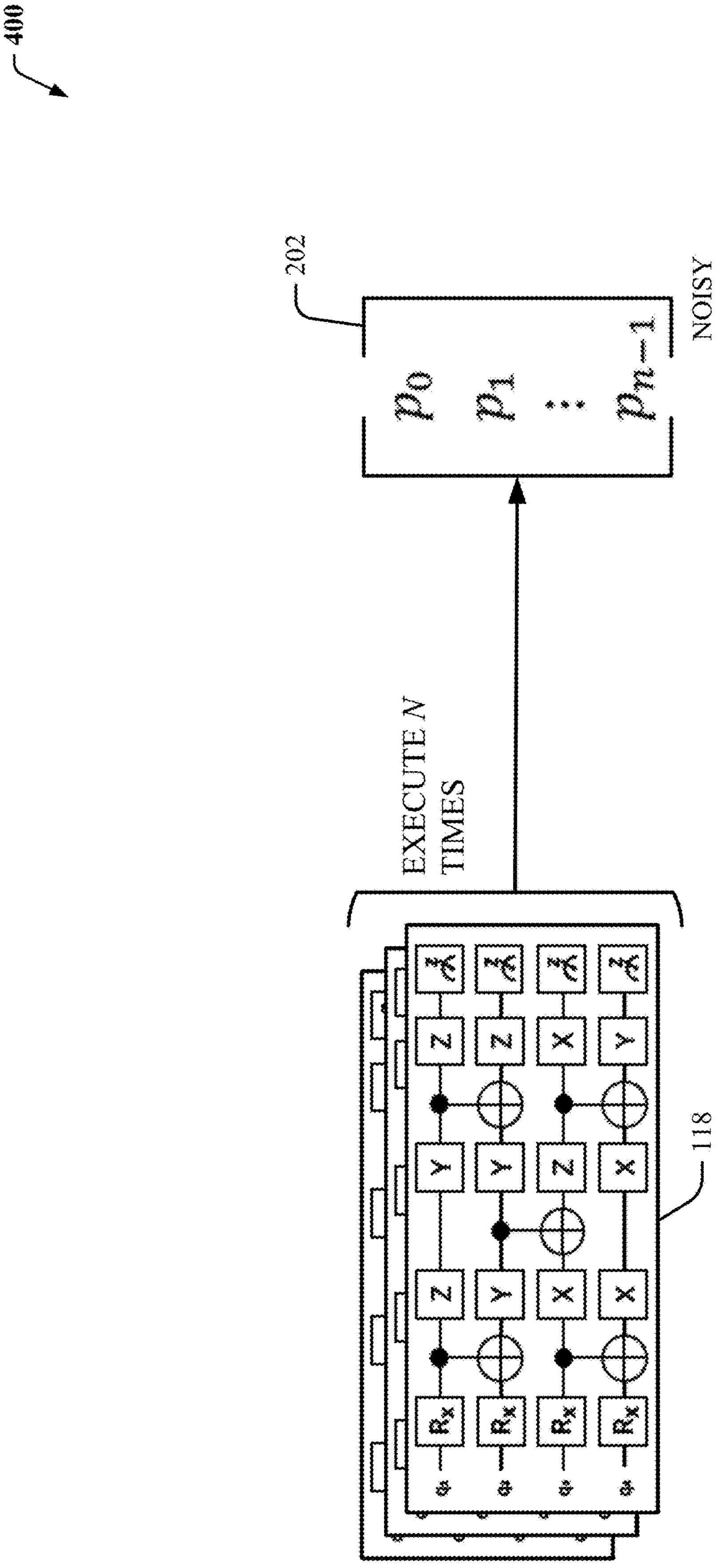
FIG. 4 illustrates an example, non-limiting diagram showing obtains a probability distribution of observables in accordance with one or more embodiments described herein.

FIG. 4 illustrates an example, non-limiting diagram showing obtains a probability distribution of observables in accordance with one or more embodiments described herein.

In various embodiments, execution component 110 can execute quantum circuit 118 N times, where each execution (or shot) produces a specific measurement outcome, such as a bitstring. From the N shots of quantum circuit 118, evaluation component 112 can obtain probability distribution 202. More specifically, after execution of each shot, the outcome is recorded, and the process is repeated across all N shots to gather a set of measurement outcomes. The set of measurement outcomes are counted to determine a frequency of occurrence for each possible result, or noisy counts. These noisy counts are affected by various noise sources arising from imperfections in quantum hardware, such as gate errors, decoherence, and measurement inaccuracies. In various aspects, evaluation component 112 can normalize the noisy counts by, for example, dividing each noisy count by N to obtain the noise probabilities, and thus forming the probability distribution 202.

Figure 5:
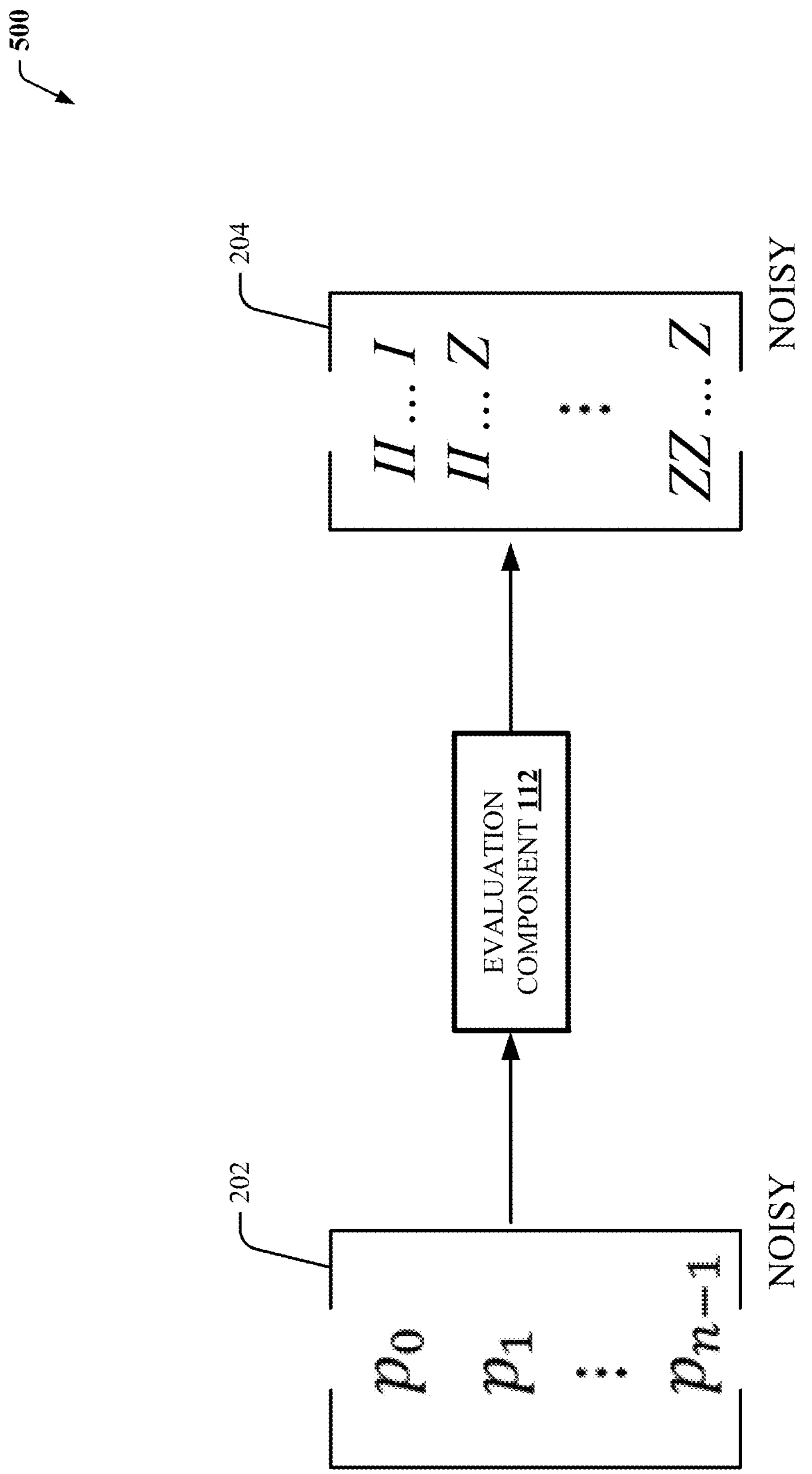
FIG. 5 illustrates an example, non-limiting diagram showing determining expectation values from a probability distribution in accordance with one or more embodiments described herein.

FIG. 5 illustrates an example, non-limiting diagram 500 showing determining expectation values from a probability distribution in accordance with one or more embodiments described herein.

In various embodiments, evaluation component 112 can electronically access the probability distribution 202. In various aspects, evaluation component 112 can receive the probability distribution 202 and output expectation values 204 of the observables, where the observables comprise I-type and Z-type observables. I-type and Z-type observables are types of Pauli operators. The/Pauli operator represents the identity operation (e.g., identity operator), meaning it leaves the quantum state unchanged. The Z Pauli operator is one of the Pauli matrices and corresponds to a phase-flip operation (e.g., Pauli-Z operator). The Z Pauli operator acts on qubits by flipping the phase of the $|1\rangle$ state while leaving the $|0\rangle$ state unchanged. In other words, I is the identity observable and Z is the phase-flip observable, which measures whether the qubit is in a $|0\rangle$ or $|1\rangle$. The Z-type observables can be denoted by $Z^b$, $b\in\{0,1\}^n$ where n is the number of qubits. For example, the multi-qubit operator $Z^{010011}$=IZIIZZ represents a Pauli operator where the bitstring 010011 indicates where the Pauli-Z operator is applied. The weight of an observable can be defined by the number on non-identity operators (e.g., Z, X, or Y operators) in the multi-qubit operator. That is, the weight counts how many qubits are acted upon by a non-identity operator. For example, $Z^{010011}$ has a weight of $wt(Z^{010011})=3$. Since the commutation relation $[Z^{b_1}, Z^{b_2}]=0\ \forall\ b_1, b_2$, where $b_1$ and $b_2$ denote a first and a second bitstring respectively, all of the expectation values 204 for all the $2^n$ observables of the form $Z^b$ can be determined from the probability distribution 202. The commutation relation holds because the Pauli-Z operators acting on different qubits commute with each other (e.g., Pauli-Z operators acting on different qubits do not interfere with each other). Thus, evaluation component 112 can determine the expectation values 204 of the observables using the probability distribution 202. Furthermore, determination of the expectation values 204 can be determined without additional quantum computation resources. For instance, the expectation values 204 can be determined without additional hardware execution, and can be determined using only the probability distribution 202.

Figure 6:
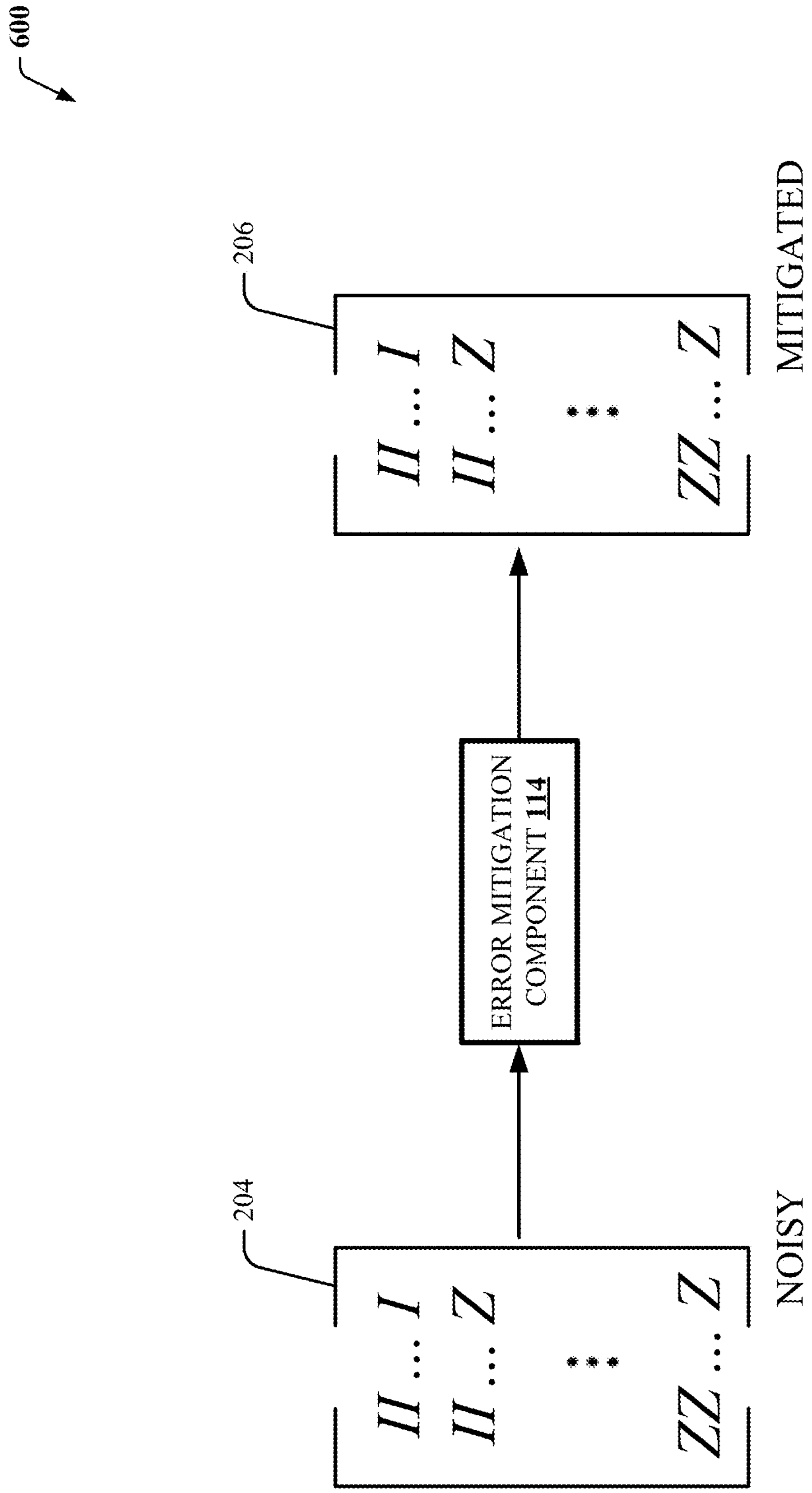
FIG. 6 illustrates an example, non-limiting diagram showing performing error mitigation on expectation values to obtain error mitigated expectation values in accordance with one or more embodiments described herein.

FIG. 6 illustrates an example, non-limiting diagram 600 showing performing error mitigation on expectation values to obtain error mitigated expectation values in accordance with one or more embodiments described herein.

In various aspects, error mitigation component 114 can electronically access the expectation values 204. In various embodiments, error mitigation component 114 can receive the expectation values 204 and output error mitigated expectation values 206 of the observables. In various instances, error mitigation component 114 can apply any suitable method of error mitigation to determine the error mitigated expectation values 206. In some cases, the method of error mitigation to be applied can be specified by the entity 302 and received as input. For example, error mitigation component 114 can apply ZNE by executing the shots of the quantum circuit 118 at different noise levels and extrapolating the expectation values 204 to estimate the error mitigated expectation values 206 as if the noise were zero. As another example, error mitigation component 114 can apply PEC by applying an inverse noise model to the expectation values 204 to estimate the error mitigated expectation values 206. As yet another example, error mitigation component 114 can apply PEA by amplifying noise during execution of the plurality of shots of quantum circuit 118 and constructing a noise model that counteracts the impact of the noise.

In one or more embodiments, the method of error mitigation to be applied can be selected based on hardware or resource constraints. For instance, a set of constraints can be received as input from the entity 302 and the error mitigation component 114 can perform a method of error mitigation that satisfies the set of constraints.

In various aspects, error mitigation component 114 can error mitigate each of the expectation values 204 to generate the error mitigated expectation values 206. Since the number of expectation values to error mitigate is exponential (e.g., $2^n$), in cases where error mitigating each expectation value can be costly and computationally intensive, various methods can be employed to reduce the number of expectation values to error mitigate for obtaining the error mitigated expectation values 206. Various aspects are described with respect to FIGS. 14 and 15.

Figure 7:
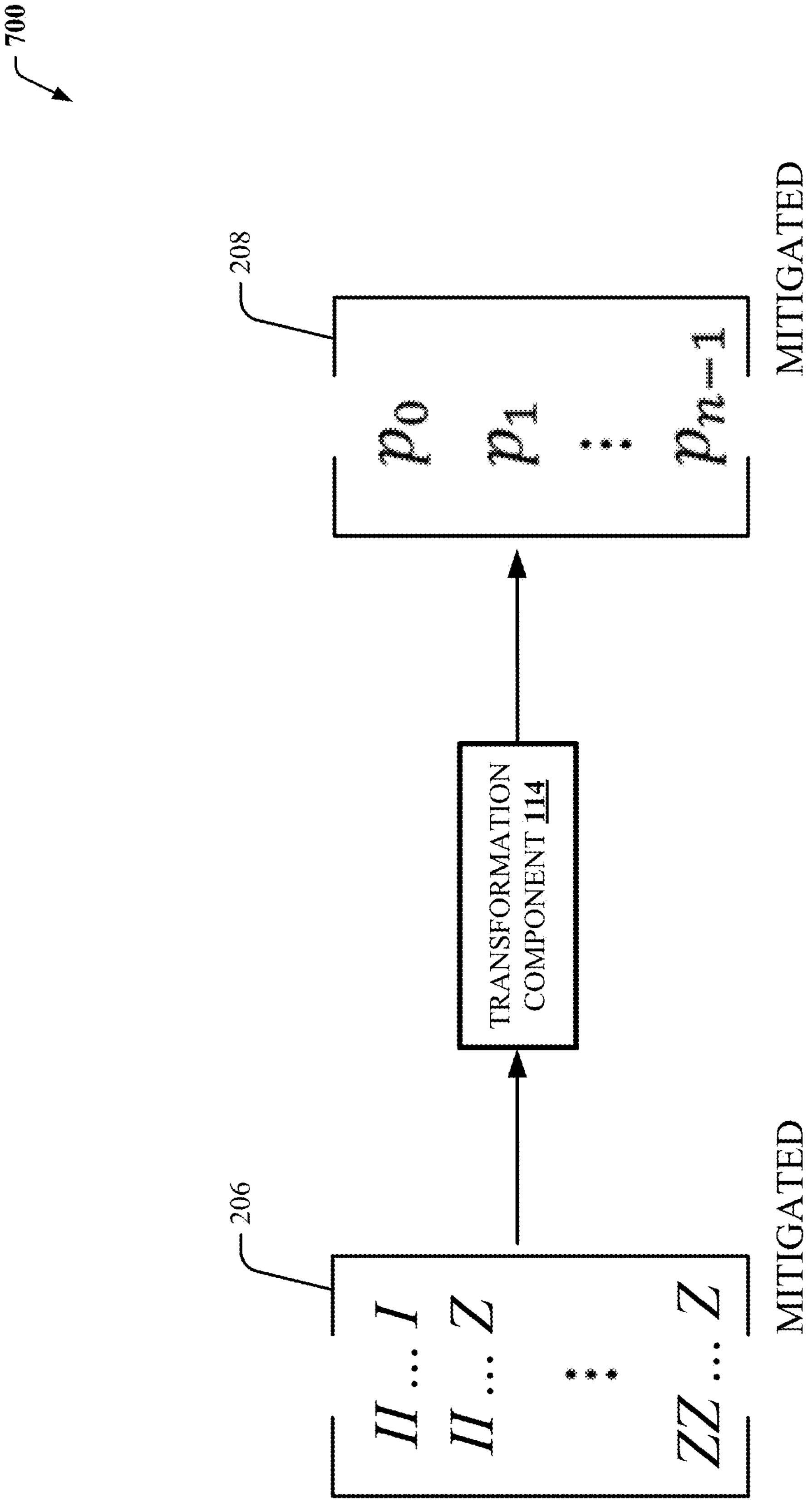
FIG. 7 illustrates an example, non-limiting diagram showing transforming error mitigated expectation values into an error mitigated probability distribution in accordance with one or more embodiments described herein.

FIG. 7 illustrates an example, non-limiting diagram 700 showing transforming error mitigated expectation values into an error mitigated probability distribution in accordance with one or more embodiments described herein.

In various embodiments, transformation component 116 can electronically access the error mitigated expectation values 206. In various aspects, error mitigation component 114 can receive the error mitigated expectation values 206 and output error mitigated probability distribution 208. As described herein, transformation component 116 can apply various methods to transform the error mitigated expectation values 206 into the error mitigated probability distribution 208. In other words, transformation component 116 can apply any transformation that maps the error mitigated expectation values 206 of the observables back to a probability distribution space.

For example, transformation component 116 can employ a Maximum Likelihood transformation (or Maximum Likelihood Estimation, MLE). The Maximum Likelihood transformation is a statistical method to estimate the parameters of a probability distribution by finding the parameter values that maximize the likelihood of the observed data given the probability distribution. Accordingly, to apply a Maximum Likelihood transformation, transformation component 116 can estimate the error mitigated probability distribution 208 by estimating a mean and variance of the error mitigated probability distribution 208 using a likelihood function and maximize the likelihood function.

As another example, transformation component 116 can perform a Walsh-Hadamard transformation on the error mitigated expectation values 206 by performing an inverse of the Walsh-Hadamard matrix. Various aspects and methods to transform the error mitigated expectation values 206 into the error mitigated probability distribution 208 are described with respect to FIGS. 10 and 11.

Figure 8:
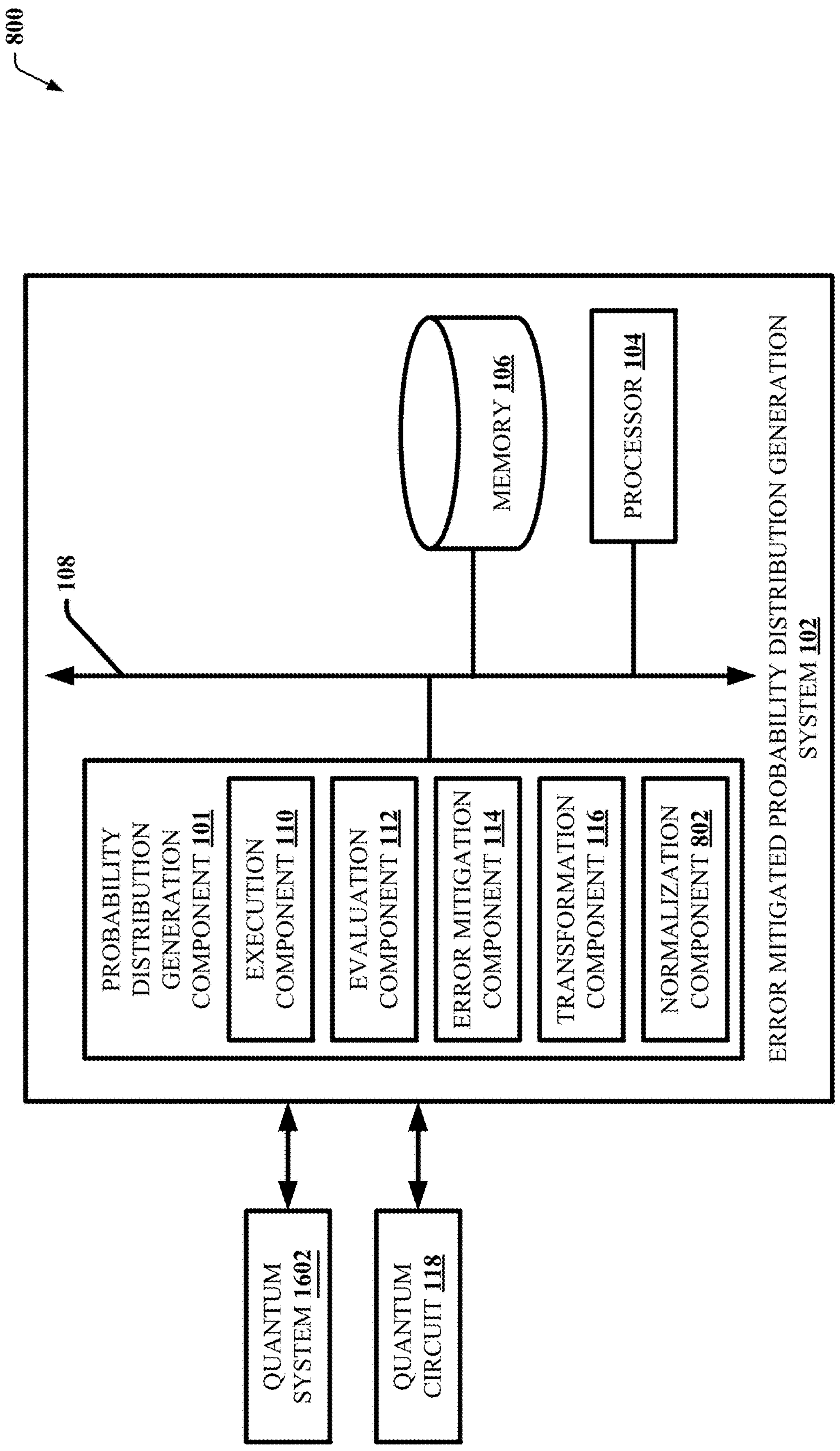
FIG. 8 illustrates a block diagram of an example, non-limiting system including a normalization component that can facilitate quantum error mitigation for probability distributions in accordance with one or more embodiments described herein.

FIG. 8 illustrates a block diagram of an example, non-limiting system 800 including a normalization component that can facilitate quantum error mitigation for probability distributions in accordance with one or more embodiments described herein. As shown, non-limiting system 100 can, in some cases, comprise the same components as non-limiting system 100 can further comprise a normalization component 802.

In various embodiments, normalization component 802 can, as described herein, normalize the error mitigated probability distribution 208. In various cases, normalization component 802 can normalize the error mitigated probability distribution 208 if the error mitigated probability distribution 208 is invalid. A probability distribution can be invalid if it contains values (e.g., expectation values) that are negative, exceed one, or do not sum to one. In response to generating an invalid error mitigated probability distribution 208, normalization component 802 can normalize the error mitigated probability distribution 208 to adjust the values to form a valid probability distribution. For instance, normalization component 802 can normalize the error mitigated probability distribution 208 by scaling values (e.g., removing negative values or values exceeding one) to ensure the sum equals one.

Figure 9:
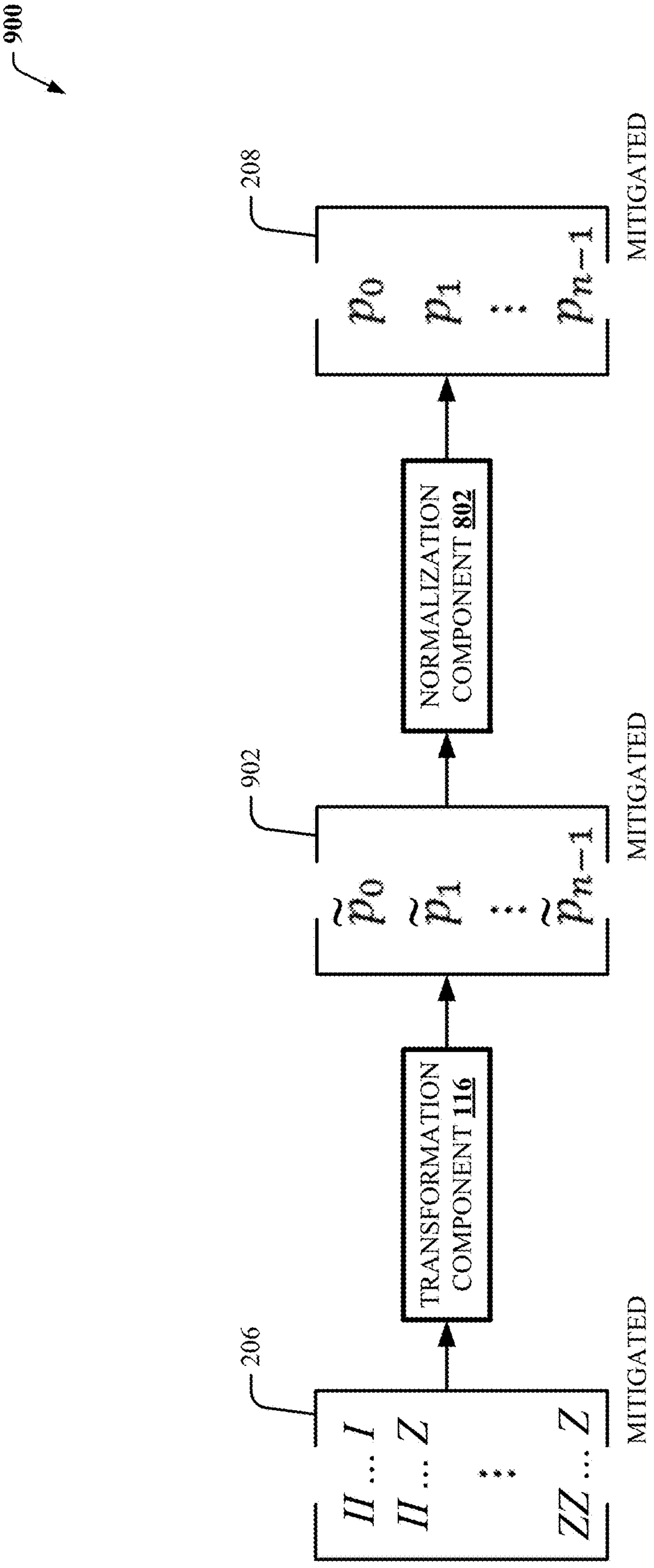
FIG. 9 illustrates an example, non-limiting diagram showing normalizing an error mitigated probability distribution in accordance with one or more embodiments described herein.

FIG. 9 illustrates an example, non-limiting diagram showing normalizing an error mitigated probability distribution in accordance with one or more embodiments described herein.

In various cases, transformation component 116 can transform the error mitigated expectation values 206 into an invalid error mitigated probability distribution 902. Accordingly, normalization component 802 can apply any suitable normalization methods to the invalid error mitigated probability distribution 902 to obtain a valid error mitigated probability distribution 208. For instance, normalization component 802 can employ Min-Max normalization to rescale the error mitigated expectation values 206 to a specific range of values. In other instances, normalization component 802 can employ Z-Score Normalization (Standardization) to standardize the error mitigated expectation values 206 to have a mean of 0 and a standard deviation of 1. In any case, normalization component 802 can normalize the error mitigated probability distribution 208.

Figure 10:
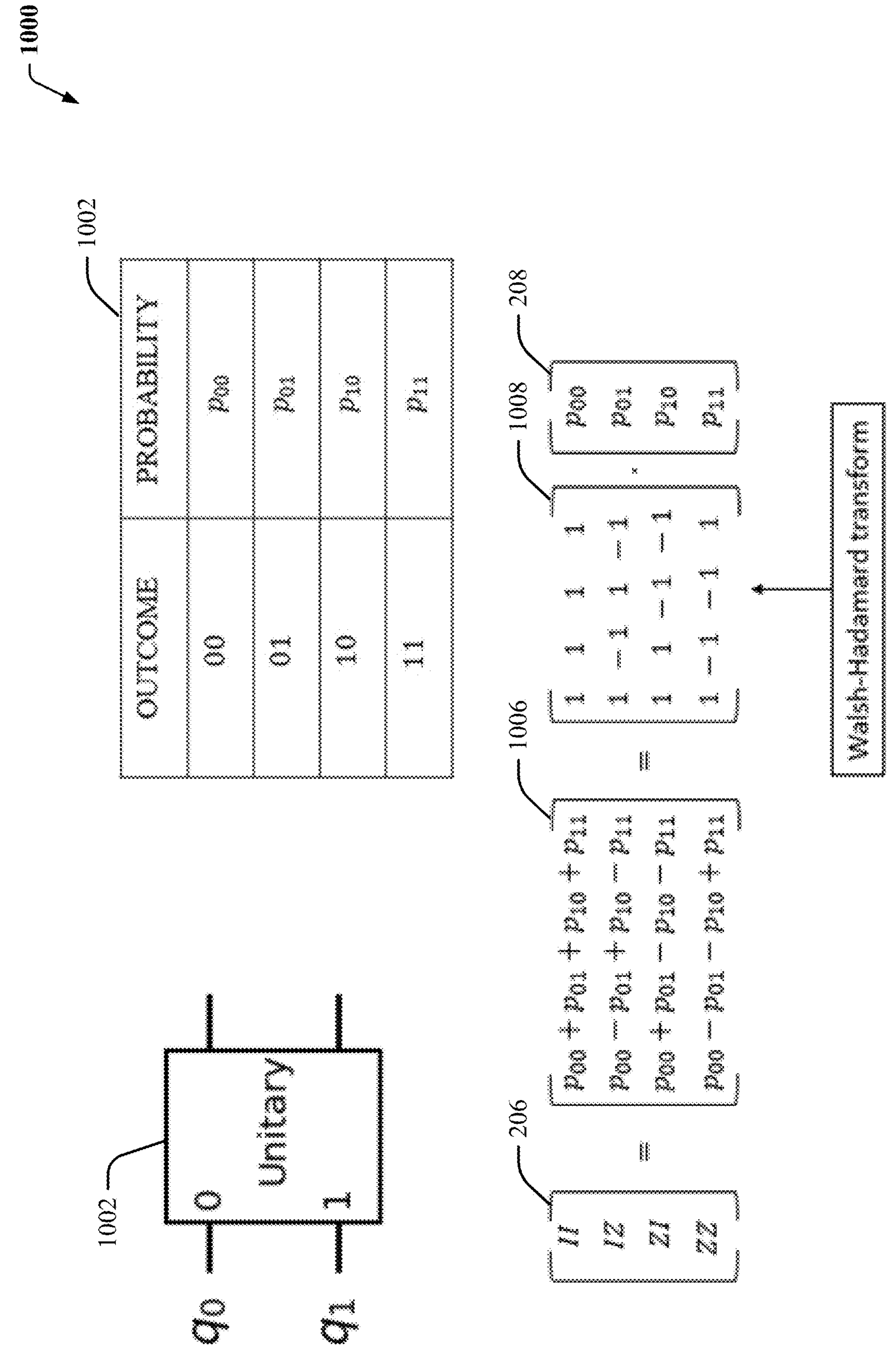
FIG. 10 illustrates an example, non-limiting diagram showing transforming error mitigated expectation values into an error mitigate probability distribution in accordance with one or more embodiments described herein.

FIG. 10 illustrates an example, non-limiting diagram 1000 showing transforming error mitigated expectation values into an error mitigate probability distribution in accordance with one or more embodiments described herein.

Depicted in non-limiting diagram 1000 is an example of applying the Walsh-Hadamard transformation on the error mitigated expectation values 206. For example, a quantum circuit 1002 with a single unitary operation acting on two qubits has a probability distribution 1004. Specifically, the probability distribution 1004 consists of four possible outcomes, which are 00, 01, 10, and 11, with probabilities $p_{00}$, $p_{01}$, $p_{10}$, and $p_{11}$ respectively. In a 2-qubit example, the error mitigated expectation values 206 can comprise elements II, IZ, ZI, and ZZ, which equals matrix 1006, whose elements are linear combinations of the probabilities corresponding to the quantum states. As an example, IZ denotes the identity operation applied to the second qubit, meaning the first qubit is 0, the second qubit is 1, and thus the overall quantum state will acquire a negative sign, hereby resulting in $p_{00}-p_{01}+p_{10}-p_{11}$ as shown in matrix 1006. In various embodiments, transformation component 116 can express matrix 1006 as a vector of the error mitigated probability distribution 208 with Walsh-Hadamard transformation matrix 1008. The Walsh-Hadamard transformation matrix 1008 comprises elements of 1 or −1 based on the linear combinations of the probabilities corresponding to the quantum states. For instance, the Walsh-Hadamard transformation matrix 1008 comprises elements $\{1, -1, 1, -1\}$ that correspond to the IZ operation. In various aspects, matrix 1006 can then equal a product of the Walsh-Hadamard transformation matrix 1008 and the error mitigated probability distribution 208.

Figure 11:
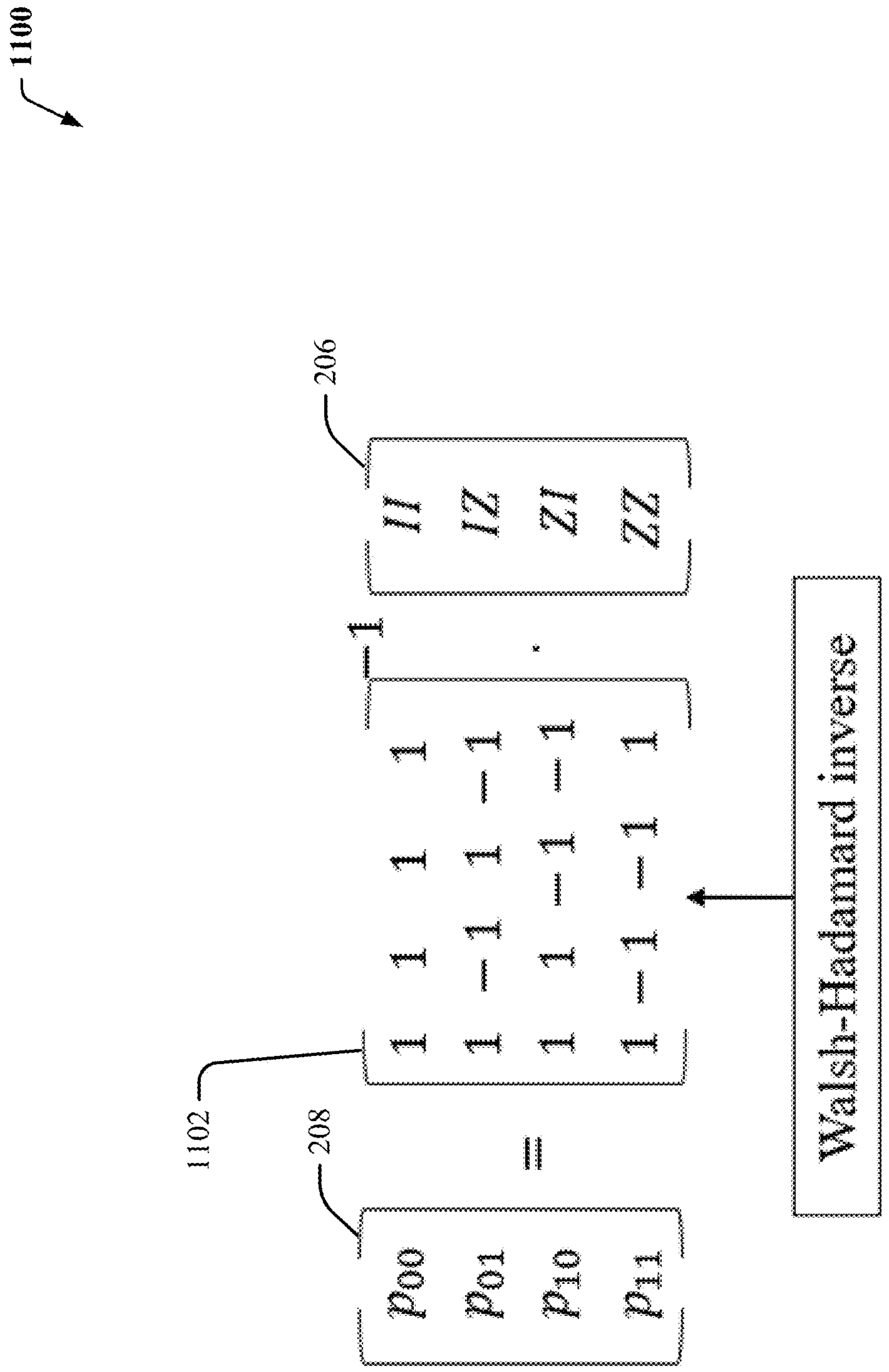
FIG. 11 illustrates an example, non-limiting diagram showing transforming error mitigated expectation values into an error mitigate probability distribution in accordance with one or more embodiments described herein.

FIG. 11 illustrates an example, non-limiting diagram showing transforming error mitigated expectation values into an error mitigate probability distribution in accordance with one or more embodiments described herein.

In various embodiments, as shown, a product of an inverse of the Walsh-Hadamard transformation matrix 1008 (e.g., inverse Walsh-Hadamard transformation matrix 1102) with the error mitigated expectation values 206 can yield the error mitigated probability distribution 208. Accordingly, transformation component 116 can apply the Walsh-Hadamard transformation by computing the product of inverse Walsh-Hadamard transformation matrix 1102 and error mitigated expectation values 206, thus resulting in the error mitigated probability distribution 208.

The Walsh-Hadamard transformation matrix 1008 and similarly the inverse Walsh-Hadamard transformation matrix 1102 can comprise a large size as the number of qubits n increases. Specifically, the size of the Walsh-Hadamard transformation matrix 1008 and the inverse Walsh-Hadamard transformation matrix 1102 is $2^n \times 2^n$. To address this, transformation component 116 can dynamically compute the Walsh-Hadamard transformation matrix 1008 or the inverse Walsh-Hadamard transformation matrix 1102. In other words, transformation component 116 can dynamically compute only elements of the Walsh-Hadamard transformation matrix 1008 or the inverse Walsh-Hadamard transformation matrix 1102 as they are needed. The Walsh-Hadamard transformation matrix 1008 can be dynamically calculated using the following equation:

$Z^b = \sum_a (-1)^{\langle a,b \rangle} |a\rangle\langle a|$ where a and b denote quantum states.

Similarly, the inverse Walsh-Hadamard transformation matrix 1102 can be dynamically computed to obtain the error mitigated probability distribution 208 because the inverse Walsh-Hadamard transformation matrix 1102 is a scaling of the Walsh-Hadamard transformation matrix 1008. The inverse Walsh-Hadamard transformation matrix 1102 can be defined by the following scaling of the Walsh-Hadamard transformation matrix 1008:

$$WH_{inv} = \frac{1}{2^n} \cdot WH$$

where WH denotes the Walsh-Hadamard transformation matrix 1008.

Thus, the inverse Walsh-Hadamard transformation matrix 1102 can be dynamically calculated using the following equation:

$$|a\rangle\langle a| = \frac{1}{2^n}\sum_b (-1)^{\langle a,b\rangle} Z^b$$

Accordingly, transformation component 116 can dynamically compute the inverse Walsh-Hadamard transformation matrix 1102 to obtain the error mitigated probability distribution 208 without requiring additional classical overhead to store a matrix of size $2^n \times 2^n$.

Figure 12:
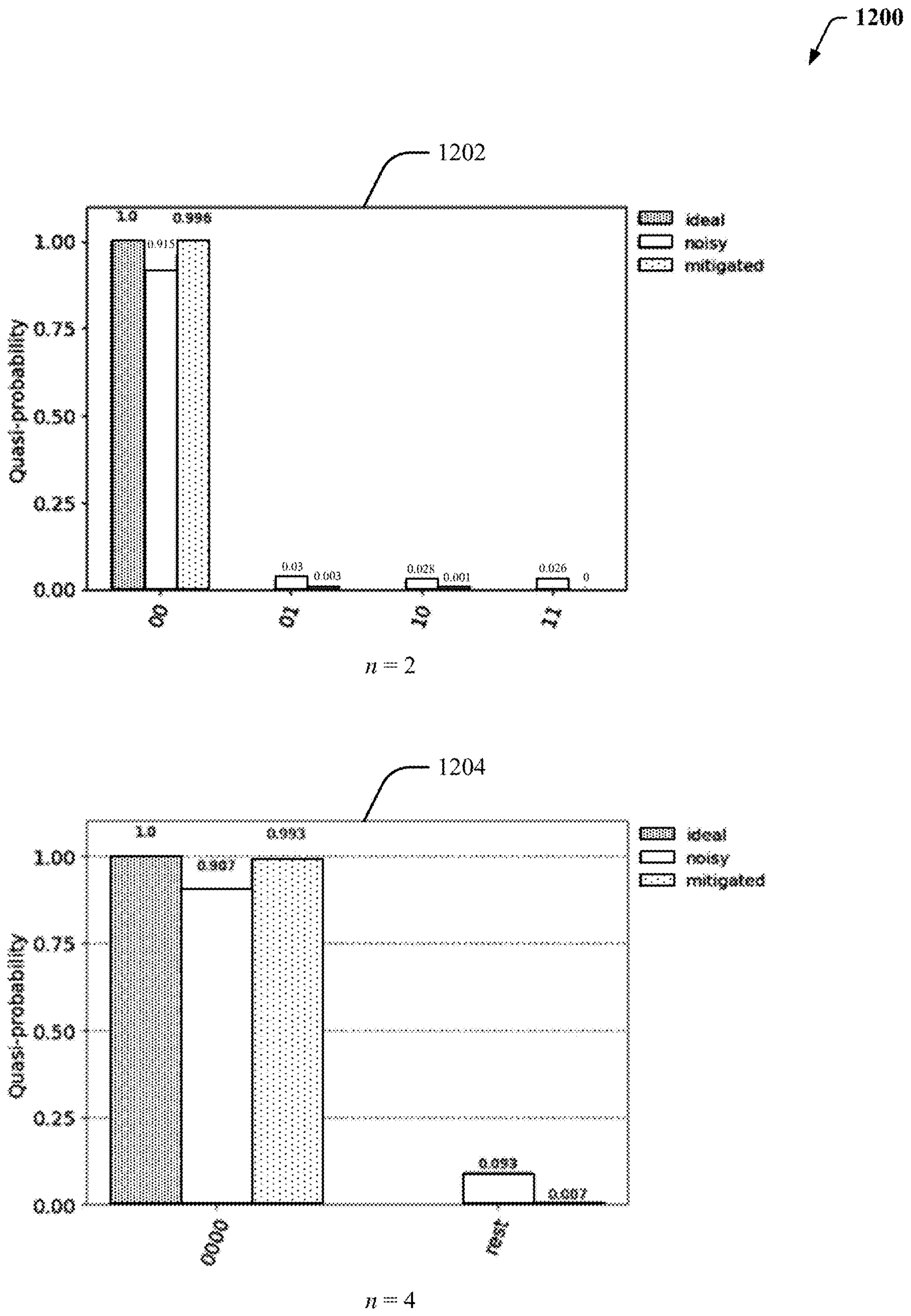
FIG. 12 illustrates an example, non-limiting diagram showing performance results of quantum error mitigation for probability distributions in accordance with one or more embodiments described herein.

FIG. 12 illustrates an example, non-limiting diagram showing performance results of quantum error mitigation for probability distributions in accordance with one or more embodiments described herein.

As shown in graph 1202 and graph 1204, performance results of error mitigated probability distributions against unmitigated (e.g., noisy) probability distributions are compared on a compute-uncompute Quantum Approximate Optimization Algorithm (QAOA) where the ideal outcome is $|0\rangle^{\otimes n}$ (e.g., 00 for 2 qubits, 0000 for 4 qubits) with ZNE applied.

As shown in graph 1202, for 2 qubits, in the presence of noise without error mitigation, the unmitigated probability distribution exhibits less accurate results than employing error mitigation for probability distributions, which nearly retrieves the ideal distribution (e.g., actual distribution). Similarly, as shown in graph 1204, for 4 qubits, the unmitigated probability distribution exhibits less accurate results than employing error mitigation for probability distributions, which nearly retrieves the ideal distribution.

Figure 13:
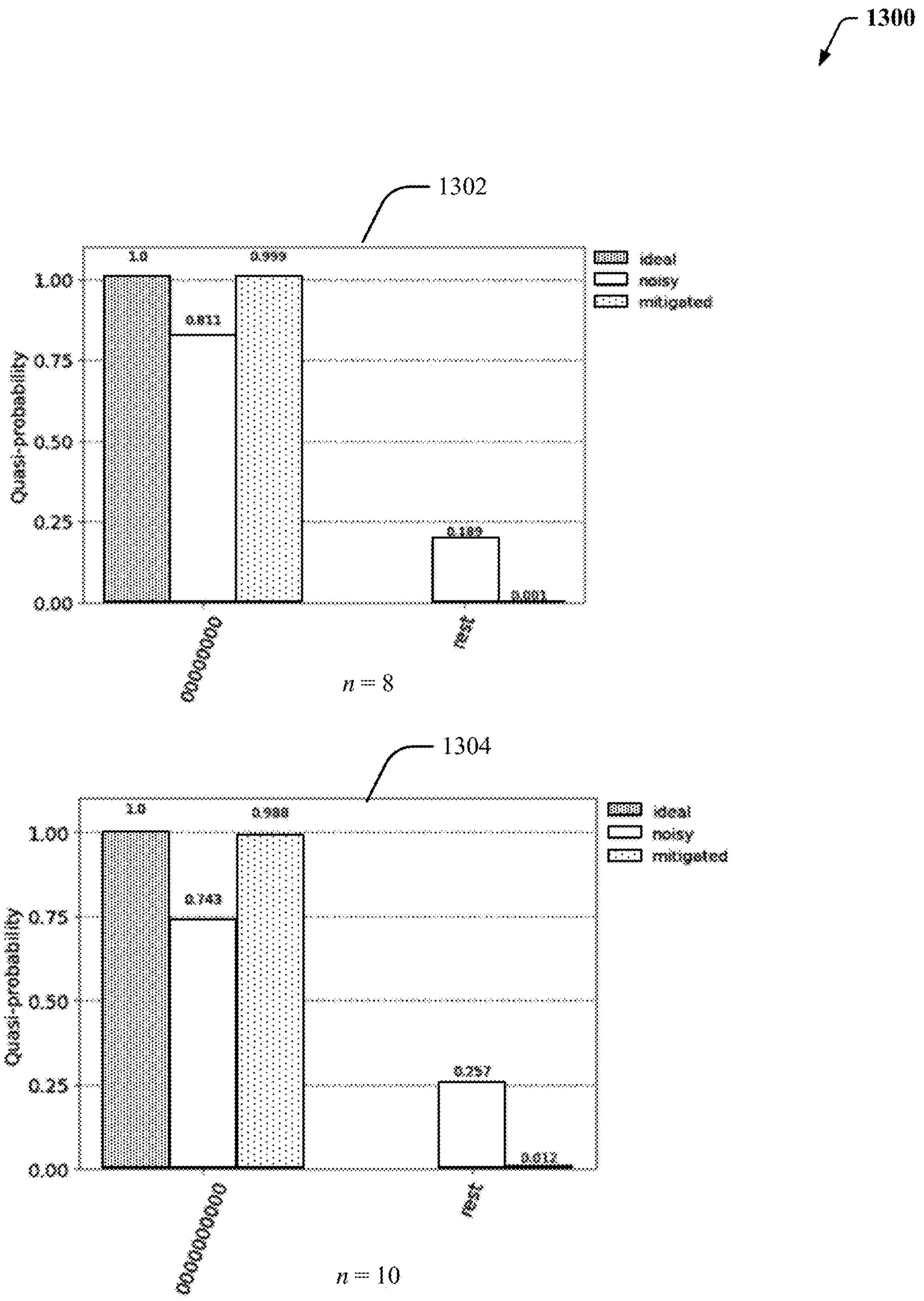
FIG. 13 illustrates an example, non-limiting diagram showing performance results of quantum error mitigation for probability distributions in accordance with one or more embodiments described herein.

FIG. 13 illustrates an example, non-limiting diagram showing performance results of quantum error mitigation for probability distributions in accordance with one or more embodiments described herein.

As shown in graph 1202 and graph 1204, performance results of error mitigated probability distributions against unmitigated (e.g., noisy) probability distributions are compared on a compute-uncompute Quantum Approximate Optimization Algorithm (QAOA) where the ideal outcome is $|0\rangle^{\otimes n}$ with ZNE applied.

As shown in graph 1302, for 8 qubits, the unmitigated probability distribution exhibits significantly less accurate results than employing error mitigation for probability distributions, which nearly retrieves the ideal distribution. Similarly, as shown in graph 1304, for 10 qubits, the unmitigated probability distribution exhibits significantly less accurate results than employing error mitigation for probability distributions, which nearly retrieves the ideal distribution.

Furthermore, in various instances, the error mitigation component 114 can further improve accuracy of the error mitigated probability distribution 208 by selecting parameters of the error mitigation method based on the computational problem. For example, if ZNE is applied with folding and extrapolation, error mitigation component 114 can select appropriate noise levels, determine how to modify the quantum circuit 118 to simulate noise, and choose a suitable extrapolation model to accurately predict the noise-free outcome to improve accuracy of the error mitigated expectation values 206.

Figure 14:
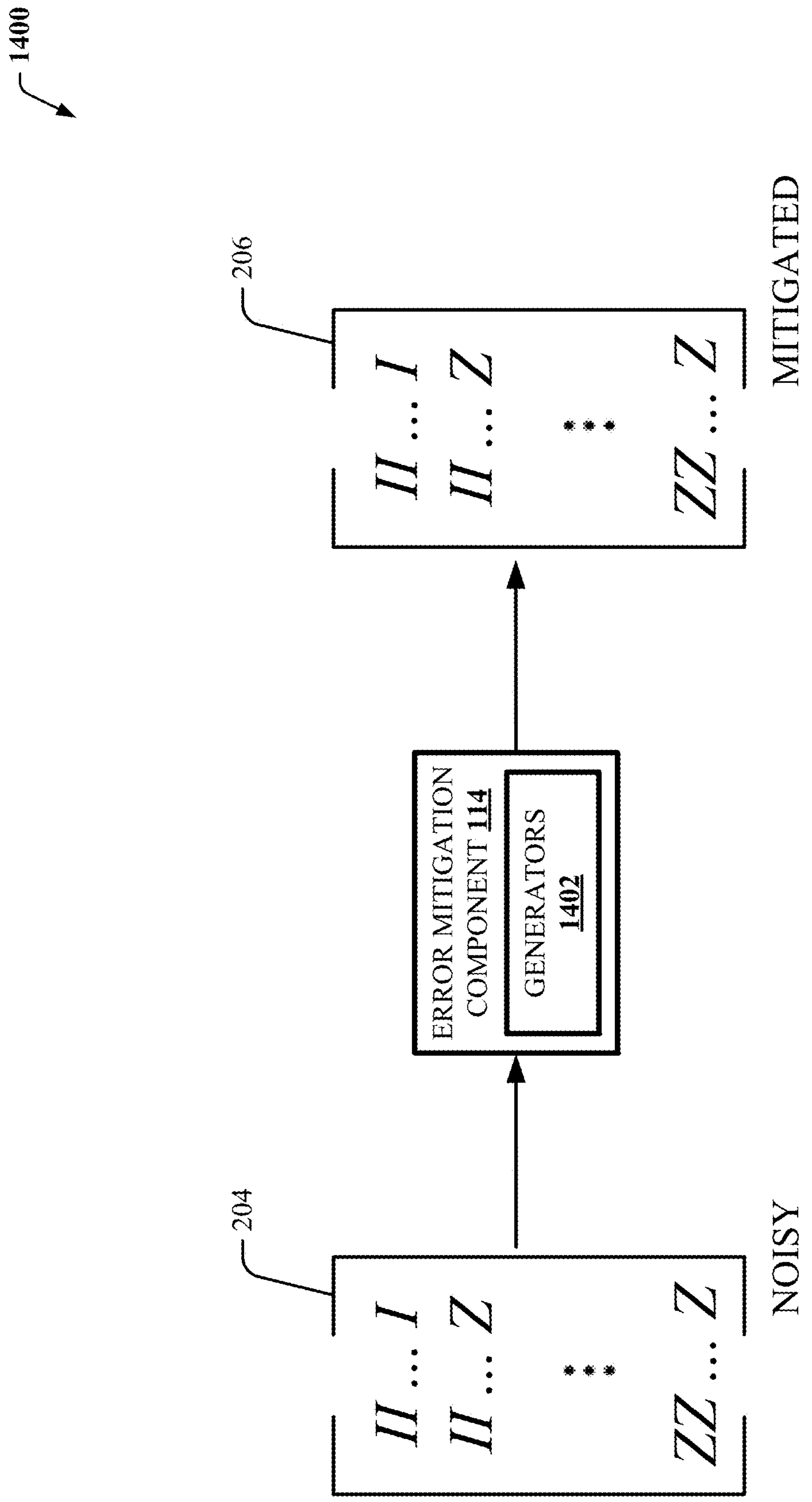
FIG. 14 illustrates an example, non-limiting block diagram showing obtaining error mitigated expectation values from generators in accordance with one or more embodiments described herein.

FIG. 14 illustrates an example, non-limiting block diagram showing obtaining error mitigated expectation values from generators in accordance with one or more embodiments described herein.

In various embodiments, to address the exponential number of expectation values 204 to error mitigate, various methods can be applied to reduce the number of expectation values 204 needed to error mitigate, and thus reducing additional overhead to obtain the error mitigated probability distribution 208 and enabling scalability to larger numbers of qubits.

In some cases, if the expectation values 204 on individual qubits or observables are independent (e.g., random variables are known to be independent), then error mitigation component 114 can form a cyclic group of generators 1402 to reduce the number of expectation values 204 to error mitigate since post-processing becomes linear.

In various aspects, error mitigation component 114 can form the cyclic group of generators 1402 based on weights of the observables. A cyclic group is a group that can be generated by a single element, called a generator. In particular, if the weight of an observable is 0 or 1 (e.g., $wt(Z^b)=1$ or $wt(Z^b)=0$), error mitigation component 114 can use the observable as generators 1402. Therefore, there are linearly many expectation values 204 to error mitigate instead of exponentially many, enabling scalability to larger numbers of qubits. Accordingly, error mitigation component 114 can determine the expectation values 204 of observables that are not generators 1402 using the generators 1402. For instance, if the generators 1402 comprise $\langle ZII\ldots I\rangle$ and $\langle IZI\ldots I\rangle$, then $\langle ZZI\ldots I\rangle$ can be determined by $\langle ZZI\ldots I\rangle = \langle ZII\ldots I\rangle \cdot \langle IZI\ldots I\rangle$.

Figure 15:
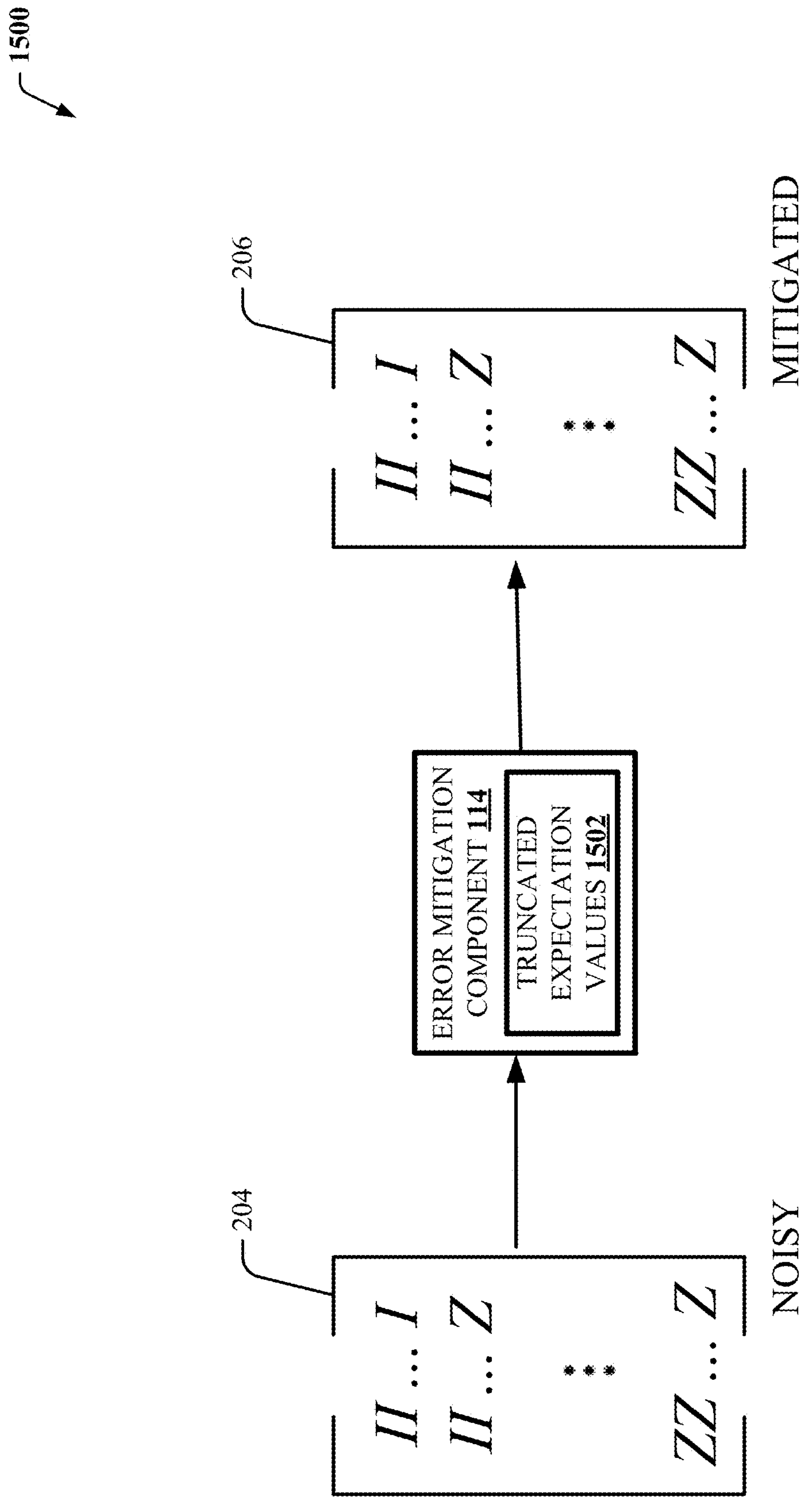
FIG. 15 illustrates an example, non-limiting diagram showing truncating observables to obtain error mitigated expectation values in accordance with one or more embodiments described herein.

FIG. 15 illustrates an example, non-limiting diagram showing truncating observables to obtain error mitigated expectation values in accordance with one or more embodiments described herein.

In other cases, to reduce the number of expectation values 204 to error mitigate, if an observable has a weight larger than a threshold parameter k (e.g., $wt(Z^b)>k$), then error mitigation component 114 can truncate the expectation values 204 of such observables, creating truncated expectation values 1502. In other words, error mitigation component 114 can truncate the expectation values 204 of observables that involve many non-identity operators, and are thus associated with large errors. As a result, for observables with a weight greater than the threshold k, noise likely overwhelms the useful signal, making the measurement unreliable. Therefore, error mitigation component 114 can truncate the expectation values 204, effectively ignoring these high-weight observables to reduce error and reduce the number of expectation values 204 to error mitigate. Similarly, in some instances, if the expectation values of an observable have a magnitude smaller than a threshold parameter E, error mitigation component 114 can truncate the corresponding expectation values to 0.

Accordingly, in various embodiments, error mitigation component 114 can perform error mitigation on the truncated expectation values 1502, which comprises less expectation values than expectation values 204. Thus, the number of expectation values 204 to error mitigate is reduced to enable scalability and improve processing efficiency of determining the error mitigated probability distribution 208.

In various embodiments, by truncating the expectation values 204, transformation component 116 can obtain an approximation of the noise probabilities and accordingly an approximation of the error mitigated probability distribution 208.

As illustrated at FIG. 16, the non-limiting system 1600 can comprise a quantum system 1602 that can be employed with or separate from the classical system 102.

Generally, the quantum system 1602 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement readout 1620, can be responsive to the quantum job request 1624 and associated input data and can be based at least in part on the input data, quantum functions and/or quantum computations.

In one or more embodiments, the quantum system 1602 can comprise components, such as a quantum operation component 1603, a quantum processor 1606, pulse component 1610 (e.g., a waveform generator) and/or a readout electronics 1620 (e.g., readout component). In one or more other embodiments, the readout electronics 1620 can be comprised at least partially by the classical system 102 and/or be external to the quantum system 1602. The quantum processor 1606 can comprise one or more, such as plural, qubits 1607. Individual qubits 1607A, 1607B and 1607C, for example, can be fixed frequency and/or single junction qubits, such as transmon qubits.

In one or more embodiments, a memory 1616 and/or processor 1614 can be associated with the quantum operation component 1603, where suitable. The processor 1614 can be any suitable processor. The processor 1614 can generate one or more instructions for controlling the one or more processes of the quantum operation component 1603.

The quantum operation component 1603 can obtain (e.g., download, receive, search for and/or the like) a quantum job request 1624 requesting execution of one or more quantum programs and/or a physical qubit layout. The quantum job request 1624 can be provided in any suitable format, such as a text format, binary format and/or another suitable format. In one or more embodiments, the quantum job request 1624 can be obtained by a component other than of the quantum system 1602, such as a by a component of the classical system 102.

The quantum operation component 1603 can determine mapping of one or more quantum logic circuits for executing a quantum program. In one or more embodiments, the quantum operation component 1603 and/or quantum processor 1606 can direct the waveform generator 1610 to generate one or more pulses, tones, waveforms and/or the like to affect one or more qubits 1607, such as in response to a quantum job request 1624.

The waveform generator 1610 can generally cause the quantum processor 1606 to perform one or more quantum processes, calculations and/or measurements by creating a suitable electro-magnetic signal. For example, the waveform generator 1610 can operate one or more qubit effectors, such as qubit oscillators, harmonic oscillators, pulse generators and/or the like to cause one or more pulses to stimulate and/or manipulate the state(s) of the one or more qubits 1607 comprised by the quantum system 1602.

The quantum processor 1606 and a portion or all of the waveform generator 1610 can be contained in a cryogenic environment, such as generated by a cryogenic environment 1617, such as effected by a dilution refrigerator. Indeed, a signal can be generated by the waveform generator 1610 to affect one or more of the plurality of qubits 1607. Where the plurality of qubits 1607 are superconducting qubits, cryogenic temperatures, such as about 4K or lower, can be employed for function of these physical qubits. Accordingly, one or more elements of the readout electronics 1620 also can be constructed to perform at such cryogenic temperatures.

The readout electronics 1620, or at least a portion thereof, can be contained in the cryogenic environment 1617, such as for reading a state, frequency and/or other characteristic of qubit, excited, decaying or otherwise.

It is noted that the aforementioned description(s) refer(s) to the operation of a single set of instructions run on a single qubit. However, scaling can be achieved. For example, instructions can be calculated, transmitted, employed and/or otherwise used relative to one or more qubits (e.g., non-neighbor qubits) in parallel with one another, one or more quantum circuits in parallel with one another, and/or one or more qubit mappings in parallel with one another.

Figure 17:
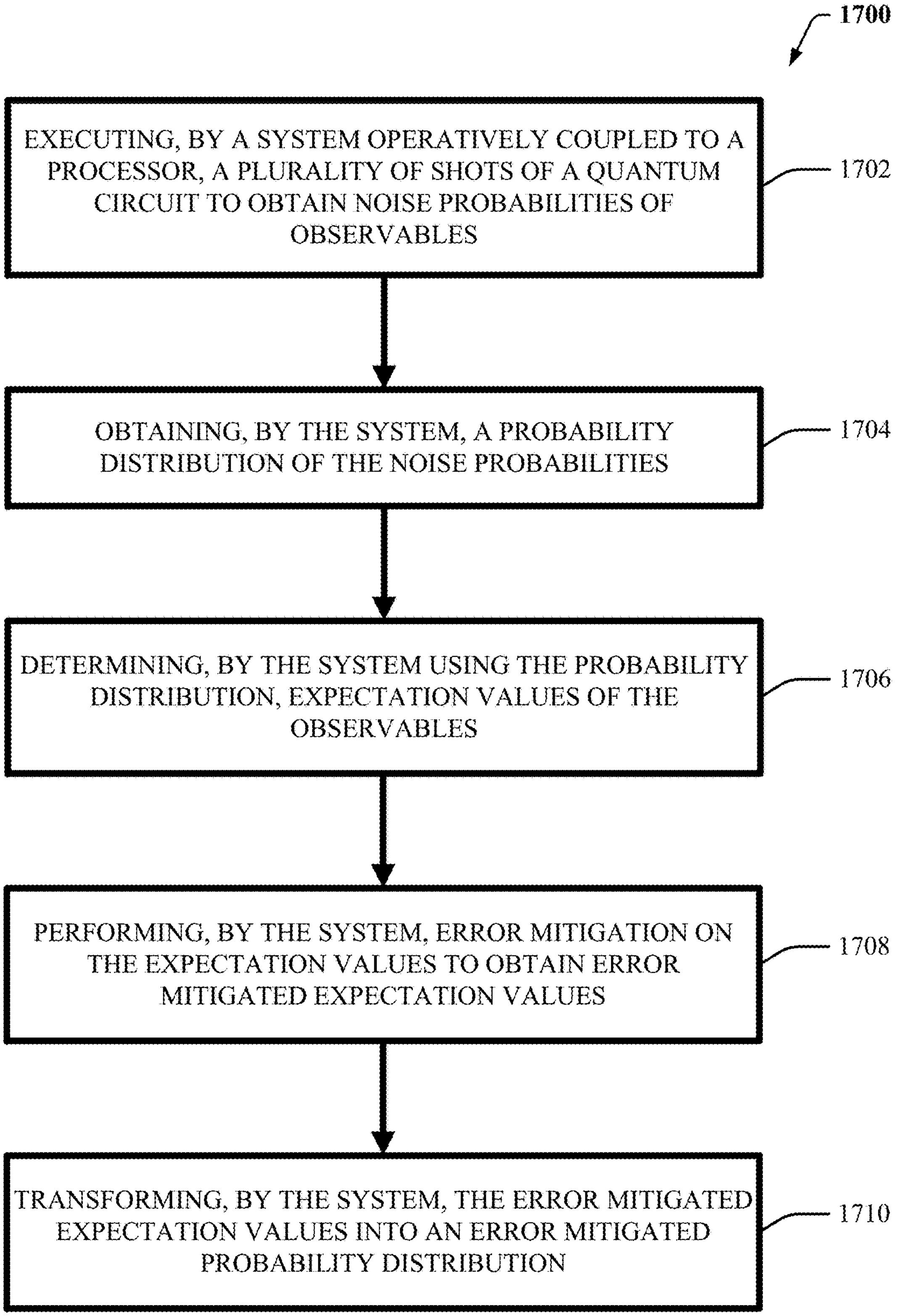
FIG. 17 illustrates a flow diagram of an example, non-limiting method that can facilitate quantum error mitigation for probability distributions in accordance with one or more embodiments described herein.

FIG. 17 illustrates a flow diagram of an example, non-limiting method 1700 that can facilitate quantum error mitigation for probability distributions in accordance with one or more embodiments described herein. Repetitive description of like elements and/or processes employed in respective embodiments is omitted for sake of brevity.

At 1702, the non-limiting method 1700 can comprise executing (e.g., by execution component 110), by a system operatively coupled to processor, a plurality of shots of a quantum circuit (e.g., 118) to obtain noise probabilities of observables.

At 1704, the non-limiting method 1700 can comprise obtaining (e.g., by evaluation component 112), by the system, a probability distribution (e.g., 202) of the noise probabilities.

At 1706, the non-limiting method 1700 can comprise determining (e.g., by evaluation component 112), by the system and using the probability distribution, expectation values of the observables.

At 1708, the non-limiting method 1700 can comprise performing (e.g., by error mitigation component 114), by the system, error mitigation on the expectation values to obtain error mitigated expectation values.

At 1710, the non-limiting method 1700 can comprise transforming (e.g., by transformation component 116), by the system, the error mitigated expectation values into an error mitigated probability distribution.

Figure 18:
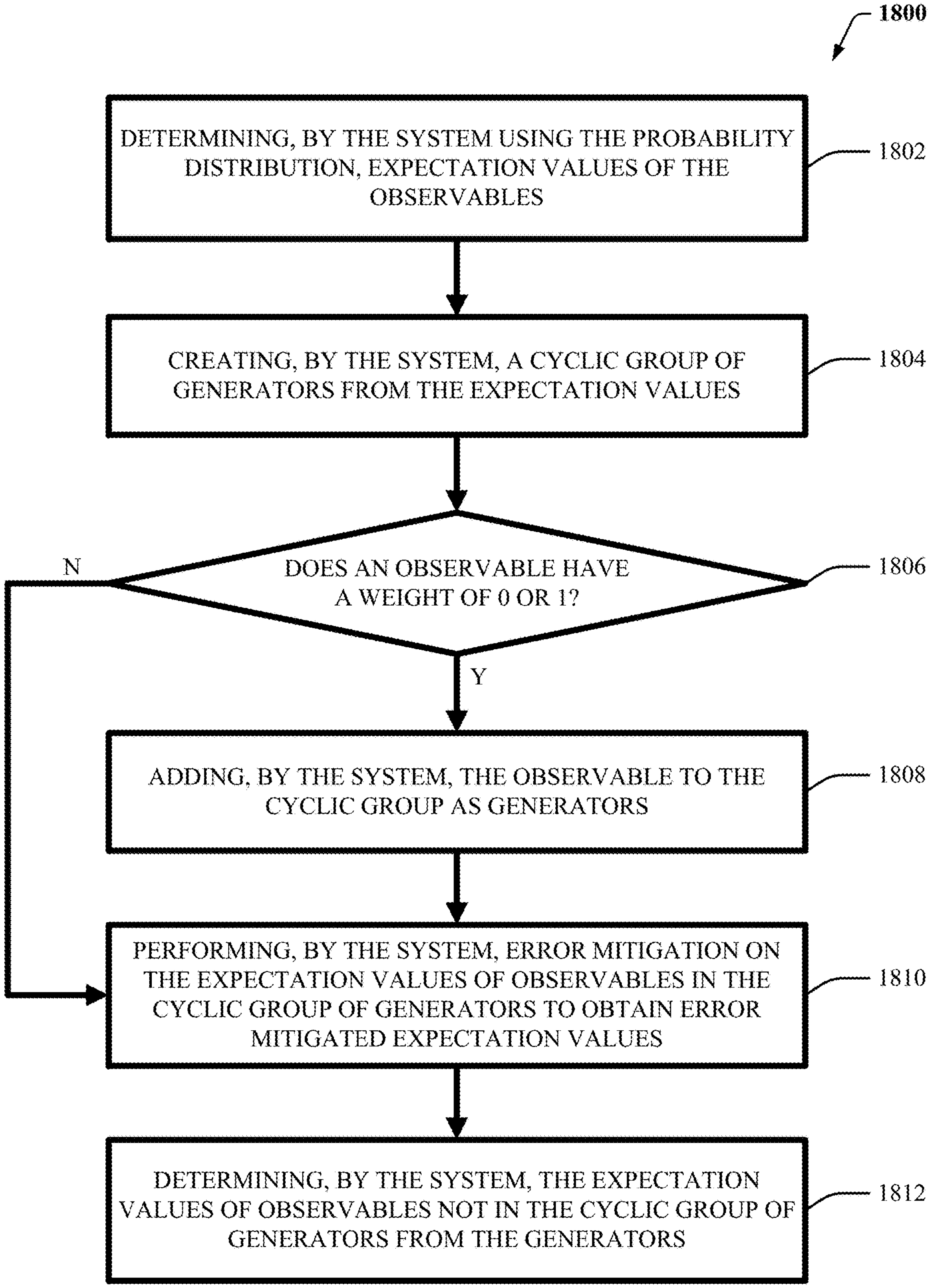
FIG. 18 illustrates a flow diagram of an example, non-limiting method that can facilitate quantum error mitigation for probability distributions in accordance with one or more embodiments described herein.

FIG. 18 illustrates a flow diagram of an example, non-limiting method 1800 that can facilitate quantum error mitigation for probability distributions in accordance with one or more embodiments described herein. Repetitive description of like elements and/or processes employed in respective embodiments is omitted for sake of brevity.

At 1802, the non-limiting method 1800 can comprise determining (e.g., by evaluation component 112), by a system operatively coupled to processor, expectation values of the observables.

At 1804, the non-limiting method 1800 can comprise creating (e.g., by evaluation component 112), by the system, a cyclic group of generators from the expectation values.

At 1806, the non-limiting method 1800 can comprise determining (e.g., by evaluation component 112), by the system, if an observable has a weight of 0 or 1. If no (e.g., the observable does not a weight of 0 or 1), the non-limiting method 1800 can proceed to 1806. If yes (e.g., the observable does a weight of 0 or 1), the non-limiting method 1800 can proceed to 1808.

At 1808, the non-limiting method 1800 can comprise adding (e.g., by evaluation component 112), by the system, the observable to the cyclic group as generators.

At 1810, the non-limiting method 1800 can comprise performing (e.g., by error mitigation component 114), by the system, error mitigation on the expectation values of observables in the cyclic group of generators to obtain error mitigated expectation values the observable to the cyclic group as generators.

At 1812, the non-limiting method 1800 can comprise determining (e.g., by evaluation component 112), by the system, the expectation values of observables not in the cyclic group of generators from the generators.

Figure 19:
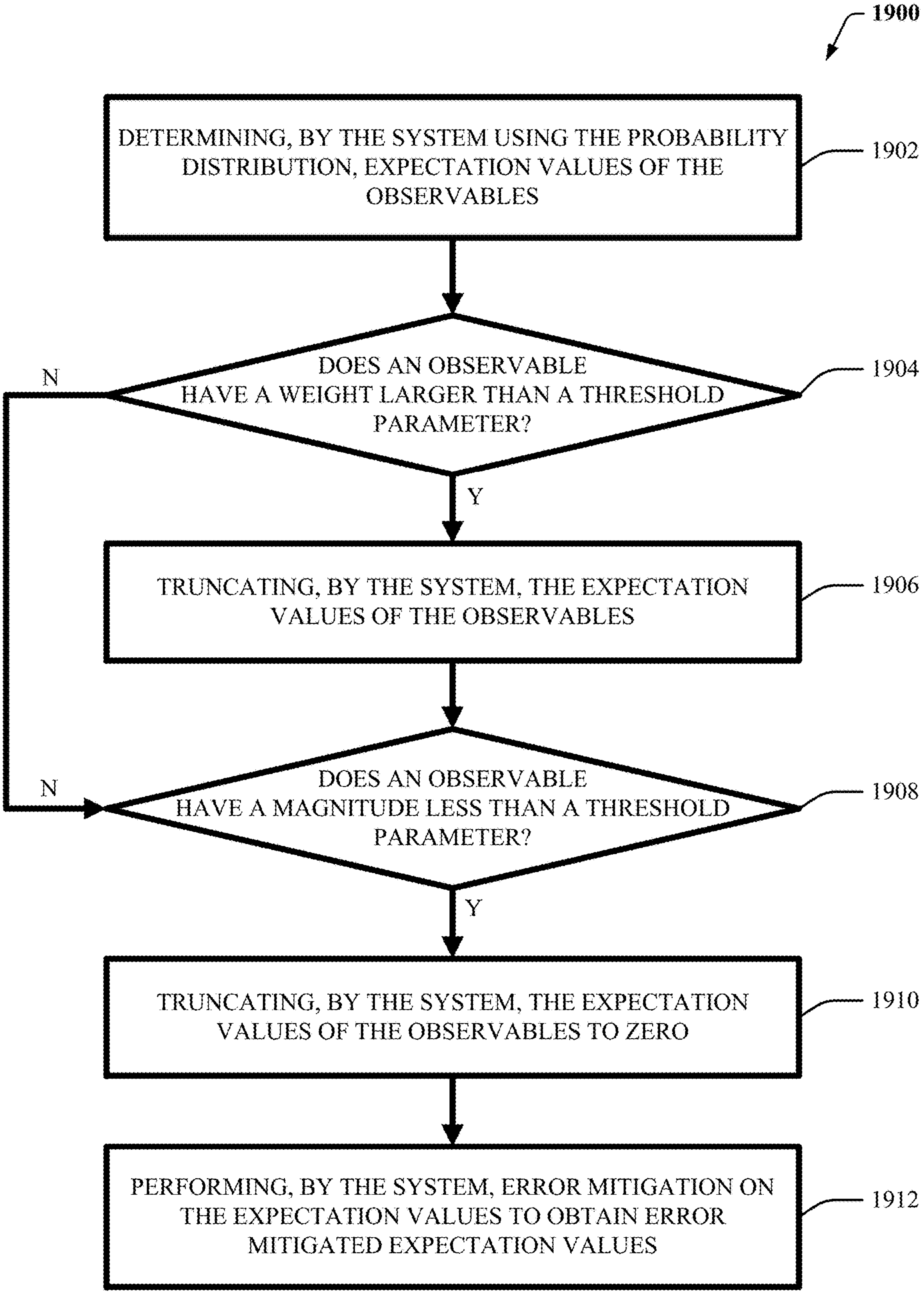
FIG. 19 illustrates a flow diagram of an example, non-limiting method that can facilitate quantum error mitigation for probability distributions in accordance with one or more embodiments described herein.

FIG. 19 illustrates a flow diagram of an example, non-limiting method 1900 that can facilitate quantum error mitigation for probability distributions in accordance with one or more embodiments described herein. Repetitive description of like elements and/or processes employed in respective embodiments is omitted for sake of brevity.

At 1902, the non-limiting method 1900 can comprise determining (e.g., by evaluation component 112), by a system operatively coupled to processor and using the probability distribution, expectation values of the observables.

At 1904, the non-limiting method 1900 can comprise the non-limiting method 1900 can comprise determining (e.g., by evaluation component 112), by the system, if an observable has a weight larger than a threshold parameter. If no (e.g., the observable does not have a weight larger than a threshold parameter), the non-limiting method 1900 can proceed to 1908. If yes (e.g., the observable has a weight larger than a threshold parameter), the non-limiting method 1900 can proceed to 1906.

At 1906, the non-limiting method 1900 can comprise truncating (e.g., by evaluation component 112), by the system, the expectation value of the observable.

At 1908, the non-limiting method 1900 can comprise determining (e.g., by evaluation component 112), by the system, if an observable has a magnitude less than a threshold parameter. If no (e.g., the observable does not have a magnitude less than a threshold parameter), the non-limiting method 1900 can proceed to 1912. If yes (e.g., the observable does have a magnitude less than a threshold parameter), the non-limiting method 1900 can proceed to 1910.

At 1910, the non-limiting method 1900 can comprise truncating (e.g., by evaluation component 112), by the system, the expectation values of the observable to zero.

At 1912, the non-limiting method 1900 can comprise performing (e.g., by error mitigation component 114), by the system, error mitigation on the expectation values to obtain error mitigated expectation values.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively quantum error mitigate probability distributions as the one or more embodiments described herein can enable this process. And, neither can the human mind nor a human with pen and paper quantum error mitigate probability distributions, as conducted by one or more embodiments described herein.

It is to be appreciated that error mitigated probability distribution generation system 102 can utilize various combination of electrical components, mechanical components, and circuitry that cannot be replicated in the mind of a human or performed by a human as the various operations that can be executed by error mitigated probability distribution generation system 102 and/or components thereof as described herein are operations that are greater than the capability of a human mind. For instance, the amount of data processed, the speed of processing such data, or the types of data processed by error mitigated probability distribution generation system 102 over a certain period of time can be greater, faster, or different than the amount, speed, or data type that can be processed by a human mind over the same period of time. According to several embodiments, error mitigated probability distribution generation system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that error mitigated probability distribution generation system 102 can include information that is impossible to obtain manually by an entity, such as a human user. For example, the type, amount, and/or variety of information included in error mitigated probability distribution generation system 102 can be more complex than information obtained manually by an entity, such as a human user.

Embodiments discussed herein can provide a number of advantages to quantum computing systems, including efficient quantum error mitigation of probability distributions to allow for scalability to larger numbers of qubits, reduced overhead, and improved accuracy of quantum error mitigation. Error mitigated probability distribution generation system 102 can provide technical improvements to a processing unit associated with error mitigated probability distribution generation system 102. For example, by truncating expectation values based on weights of observables and dynamically computing a transformation matrix to obtain the error mitigate probability distribution, the additional overhead to transform the expectation values into an error mitigated probability distribution can be minimized, thereby reducing the workload of a processing unit (e.g., processor 104) and a quantum processing unit (e.g., processor 1614). In this example, by reducing the workload of such a processing unit (e.g., processor 104, processor 1614), error mitigated probability distribution generation system 102 can thereby facilitate improved performance, improved efficiency, and/or minimum additional computational costs associated with such processing units. Error mitigated probability distribution generation system 102 can thereby facilitate improved performance, improved efficiency, and/or reduced computational cost associated with quantum computation on a quantum processor.

A practical application of error mitigated probability distribution generation system 102 is that it allows for efficient and accurate determination of an error mitigated probability distribution for various computation problems. For example, existing error mitigation methods only determine error mitigated expectation values. By transforming the error mitigated expectation values into an error mitigated probability distribution, error mitigated probability distribution generation system 102 can enable quantum error mitigation with improved scalability, improved accuracy, improved overhead of classical and quantum resources, and improved processing efficiency by truncating expectation values based on weights of observables and dynamically computing a transformation matrix to obtain the error mitigate probability distribution. Therefore, error mitigated probability distribution generation system 102 can enable quantum error mitigation that can be operated with reduced quantum and classical hardware requirements to determine an error mitigated probability distribution, thus promoting efficient quantum error mitigation.

Figure 20:
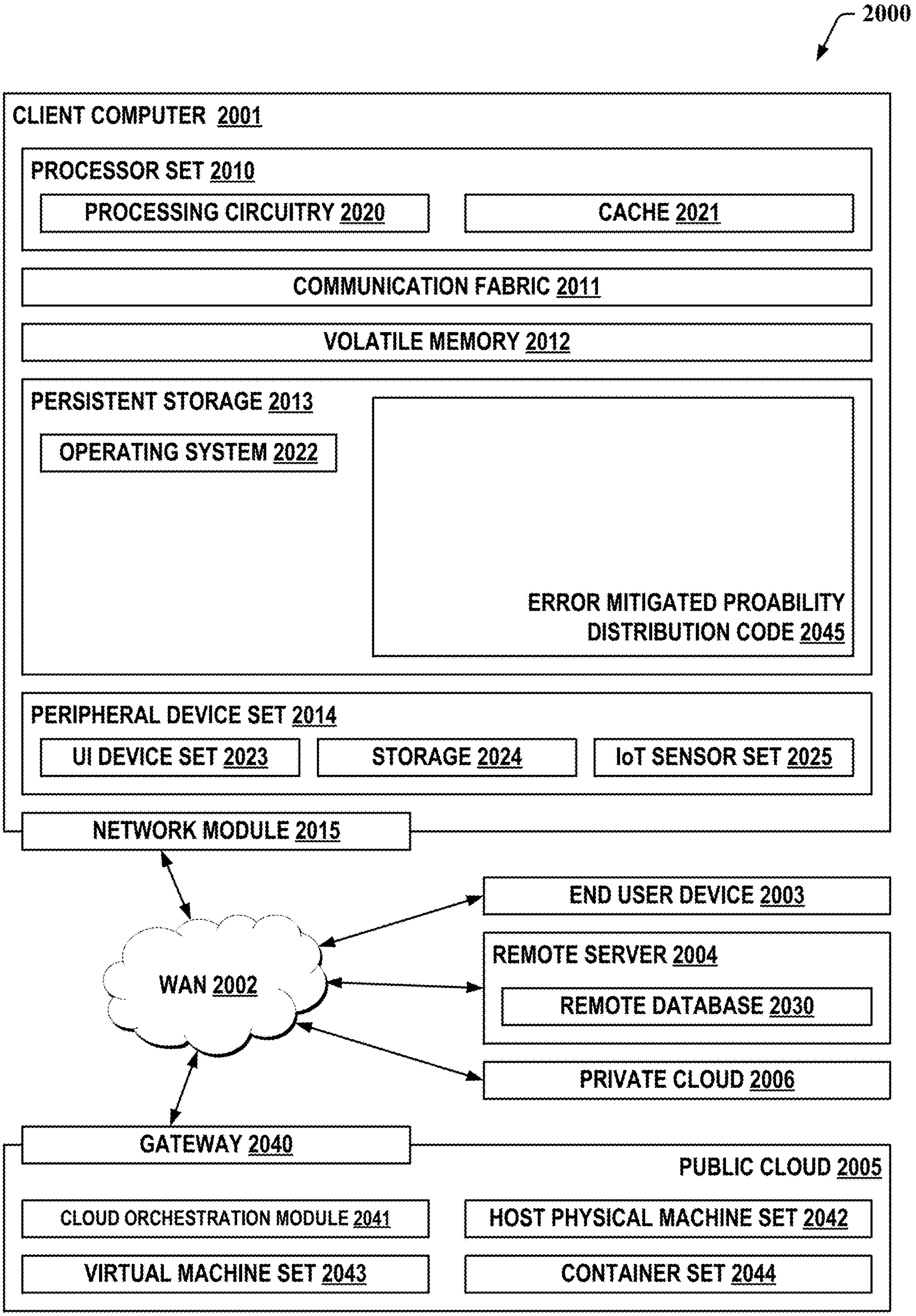
FIG. 20 illustrates a block diagram of an example, non-limiting operating environment in which one or more embodiments described herein can be facilitated.

FIG. 20 illustrates a block diagram of an example, non-limiting operating environment 2000 in which one or more embodiments described herein can be facilitated. FIG. 20 and the following discussion are intended to provide a general description of a suitable operating environment 2000 in which one or more embodiments described herein at FIGS. 1-19 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 2000 contains an example of an environment for the execution of at least some of the computer code involved in performing the inventive methods, such as error mitigated probability distribution code 2045. In addition to block 2045, computing environment 2000 includes, for example, computer 2001, wide area network (WAN) 2002, end user device (EUD) 2003, remote server 2004, public cloud 2005, and private cloud 2006. In this embodiment, computer 2001 includes processor set 2010 (including processing circuitry 2020 and cache 2021), communication fabric 2011, volatile memory 2012, persistent storage 2013 (including operating system 2022 and block 2045, as identified above), peripheral device set 2014 (including user interface (UI), device set 2023, storage 2024, and Internet of Things (IoT) sensor set 2025), and network module 2015. Remote server 2004 includes remote database 2030. Public cloud 2005 includes gateway 2040, cloud orchestration module 2041, host physical machine set 2042, virtual machine set 2043, and container set 2044.

COMPUTER 2001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 2030. As is well understood in the art of computer technology, and depending upon the technology, performance of a computer-implemented method may be distributed among multiple computers and/or between multiple locations. On the other hand, in this presentation of computing environment 2000, detailed discussion is focused on a single computer, specifically computer 2001, to keep the presentation as simple as possible. Computer 2001 may be located in a cloud, even though it is not shown in a cloud in FIG. 8. On the other hand, computer 2001 is not required to be in a cloud except to any extent as may be affirmatively indicated.

PROCESSOR SET 2010 includes one, or more, computer processors of any type now known or to be developed in the future. Processing circuitry 2020 may be distributed over multiple packages, for example, multiple, coordinated integrated circuit chips. Processing circuitry 2020 may implement multiple processor threads and/or multiple processor cores. Cache 2021 is memory that is located in the processor chip package(s) and is typically used for data or code that should be available for rapid access by the threads or cores running on processor set 2010. Cache memories are typically organized into multiple levels depending upon relative proximity to the processing circuitry. Alternatively, some, or all, of the cache for the processor set may be located "off chip." In some computing environments, processor set 2010 may be designed for working with qubits and performing quantum computing.

Computer readable program instructions are typically loaded onto computer 2001 to cause a series of operational steps to be performed by processor set 2010 of computer 2001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 2021 and the other storage media discussed below. The program instructions, and associated data, are accessed by processor set 2010 to control and direct performance of the inventive methods. In computing environment 2000, at least some of the instructions for performing the inventive methods may be stored in block 2045 in persistent storage 2013.

COMMUNICATION FABRIC 2011 is the signal conduction paths that allow the various components of computer 2001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 2012 is any type of volatile memory now known or to be developed in the future. Examples include dynamic type random access memory (RAM) or static type RAM. Typically, the volatile memory is characterized by random access, but this is not required unless affirmatively indicated. In computer 2001, the volatile memory 2012 is located in a single package and is internal to computer 2001, but, alternatively or additionally, the volatile memory may be distributed over multiple packages and/or located externally with respect to computer 2001.

PERSISTENT STORAGE 2013 is any form of non-volatile storage for computers that is now known or to be developed in the future. The non-volatility of this storage means that the stored data is maintained regardless of whether power is being supplied to computer 2001 and/or directly to persistent storage 2013. Persistent storage 2013 may be a read only memory (ROM), but typically at least a portion of the persistent storage allows writing of data, deletion of data and re-writing of data. Some familiar forms of persistent storage include magnetic disks and solid state storage devices. Operating system 2022 may take several forms, such as various known proprietary operating systems or open source Portable Operating System Interface type operating systems that employ a kernel. The code included in block 2045 typically includes at least some of the computer code involved in performing the inventive methods.

PERIPHERAL DEVICE SET 2014 includes the set of peripheral devices of computer 2001. Data communication connections between the peripheral devices and the other components of computer 2001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 2023 may include components such as a display screen, speaker, microphone, wearable devices (such as goggles and smart watches), keyboard, mouse, printer, touchpad, game controllers, and haptic devices. Storage 2024 is external storage, such as an external hard drive, or insertable storage, such as an SD card. Storage 2024 may be persistent and/or volatile. In some embodiments, storage 2024 may take the form of a quantum computing storage device for storing data in the form of qubits. In embodiments where computer 2001 is required to have a large amount of storage (for example, where computer 2001 locally stores and manages a large database) then this storage may be provided by peripheral storage devices designed for storing very large amounts of data, such as a storage area network (SAN) that is shared by multiple, geographically distributed computers. IoT sensor set 2025 is made up of sensors that can be used in Internet of Things applications. For example, one sensor may be a thermometer and another sensor may be a motion detector.

NETWORK MODULE 2015 is the collection of computer software, hardware, and firmware that allows computer 2001 to communicate with other computers through WAN 2002. Network module 2015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 2015 are performed on the same physical hardware device. In other embodiments (for example, embodiments that utilize software-defined networking (SDN)), the control functions and the forwarding functions of network module 2015 are performed on physically separate devices, such that the control functions manage several different network hardware devices. Computer readable program instructions for performing the inventive methods can typically be downloaded to computer 2001 from an external computer or external storage device through a network adapter card or network interface included in network module 2015.

WAN 2002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 2003 is any computer system that is used and controlled by an end user (for example, a customer of an enterprise that operates computer 2001), and may take any of the forms discussed above in connection with computer 2001. EUD 2003 typically receives helpful and useful data from the operations of computer 2001. For example, in a hypothetical case where computer 2001 is designed to provide a recommendation to an end user, this recommendation would typically be communicated from network module 2015 of computer 2001 through WAN 2002 to EUD 2003. In this way, EUD 2003 can display, or otherwise present, the recommendation to an end user. In some embodiments, EUD 2003 may be a client device, such as thin client, heavy client, mainframe computer, desktop computer and so on.

REMOTE SERVER 2004 is any computer system that serves at least some data and/or functionality to computer 2001. Remote server 2004 may be controlled and used by the same entity that operates computer 2001. Remote server 2004 represents the machine(s) that collect and store helpful and useful data for use by other computers, such as computer 2001. For example, in a hypothetical case where computer 2001 is designed and programmed to provide a recommendation based on historical data, then this historical data may be provided to computer 2001 from remote database 2030 of remote server 2004.

PUBLIC CLOUD 2005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 2005 is performed by the computer hardware and/or software of cloud orchestration module 2041. The computing resources provided by public cloud 2005 are typically implemented by virtual computing environments that run on various computers making up the computers of host physical machine set 2042, which is the universe of physical computers in and/or available to public cloud 2005. The virtual computing environments (VCEs) typically take the form of virtual machines from virtual machine set 2043 and/or containers from container set 2044. It is understood that these VCEs may be stored as images and may be transferred among and between the various physical machine hosts, either as images or after instantiation of the VCE. Cloud orchestration module 2041 manages the transfer and storage of images, deploys new instantiations of VCEs and manages active instantiations of VCE deployments. Gateway 2040 is the collection of computer software, hardware, and firmware that allows public cloud 2005 to communicate through WAN 2002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 2006 is similar to public cloud 2005, except that the computing resources are only available for use by a single enterprise. While private cloud 2006 is depicted as being in communication with WAN 2002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 2005 and private cloud 2006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a memory that stores computer executable components; and a processor that executes at least one of the computer executable components that:

executes a plurality of shots of a quantum circuit to obtain noise probabilities of observables;

obtains a probability distribution of the noise probabilities;

determines, using the probability distribution, expectation values of the observables;

forms a cyclic group with the observables that have a weight of zero or a weight of one as generators;

performs error mitigation on the expectation values of the generators to obtain error mitigated expectation values of the generators;

determines, using the generators, error mitigated expectation values of the observables that are not generators; and transforms the error mitigated expectation values of the generators and the observables that are not generators into an error mitigated probability distribution.

2. The system of claim 1, wherein the at least one of the computer executable components further:

performs a Walsh-Hadamard transformation on the error mitigated expectation values.

3. The system of claim 1, wherein the at least one of the computer executable components further:

performs an inverse of a Walsh-Hadamard transformation on the error mitigated expectation values.

4. The system of claim 1, wherein the at least one of the computer executable components further:

truncates the expectation values to obtain an approximation of the noise probabilities.

5. The system of claim 1, wherein the at least one of the computer executable components further:

truncates the expectation values of the observables that have a weight larger than a threshold parameter.

6. The system of claim 1, wherein the at least one of the computer executable components further:

truncates the expectation values of the observables that have a magnitude smaller than a threshold parameter to zero.

7. The system of claim 1, wherein the at least one of the computer executable components further:

performs a Maximum Likelihood transformation on the error mitigated expectation values of the generators and the observables that are not generators by estimating a mean and a variance of the error mitigated probability distribution using a likelihood function, and maximizing the likelihood function.

8. A computer-implemented method, comprising:

executing, by a system operatively coupled to a processor, a plurality of shots of a quantum circuit to obtain noise probabilities of observables;

obtaining, by the system, a probability distribution of the noise probabilities;

determining, by the system and using the probability distribution, expectation values of the observables;

forming, by the system, a cyclic group with the observables that have a weight of zero or a weight of one as generators;

performing, by the system, error mitigation on the expectation values of the generators to obtain error mitigated expectation values of the generators;

determines, by the system, using the generators, error mitigated expectation values of the observables that are not generators; and transforming, by the system, the error mitigated expectation values of the generators and the observables that are not generators into an error mitigated probability distribution.

9. The computer-implemented method of claim 8, further comprising:

performing, by the system, a Walsh-Hadamard transformation on the error mitigated expectation values.

10. The computer-implemented method of claim 8, further comprising:

performing, by the system, an inverse of a Walsh-Hadamard transformation on the error mitigated expectation values.

11. The computer-implemented method of claim 8, further comprising:

truncating, by the system, the expectation values to obtain an approximation of the noise probabilities.

12. The computer-implemented method of claim 8, further comprising:

truncating, by the system, the expectation values of the observables that have a weight larger than a threshold parameter.

13. The computer-implemented method of claim 8, further comprising:

truncating, by the system, the expectation values of the observables that have a magnitude smaller than a threshold parameter to zero.

14. The computer-implemented method of claim 8, further comprising:

performing, by the system, a Maximum Likelihood transformation on the error mitigated expectation values of the generators and the observables that are not generators by estimating a mean and a variance of the error mitigated probability distribution using a likelihood function, and maximizing the likelihood function.

15. A computer program product for determining error mitigated probability distributions, the computer program product comprising a computer readable storage medium having program instructions embodied therewith, the program instructions executable by a processor to cause the processor to:

execute a plurality of shots of a quantum circuit to obtain noise probabilities of observables;

obtain a probability distribution of the noise probabilities;

determine, using the probability distribution, expectation values of the observables;

form a cyclic group with the observables that have a weight of zero or a weight of one as generators;

perform error mitigation on the expectation values of the generators to obtain error mitigated expectation values of the generators;

determine, using the generators, error mitigated expectation values of the observables that are not generators; and transform the error mitigated expectation values of the generators and the observables that are not generators into an error mitigated probability distribution.

16. The computer program product of claim 15, wherein the program instructions executable by the processor further cause the processor to:

perform a Walsh-Hadamard transformation on the error mitigated expectation values.

17. The computer program product of claim 15, wherein the program instructions executable by the processor further cause the processor to:

perform an inverse of a Walsh-Hadamard transformation on the error mitigated expectation values.

18. The computer program product of claim 15, wherein the program instructions executable by the processor further cause the processor to:

truncate the expectation values to obtain an approximation of the noise probabilities.

19. The computer program product of claim 15, wherein the program instructions executable by the processor further cause the processor to:

truncate the expectation values of the observables that have a weight larger than a threshold parameter.

20. The computer program product of claim 15, wherein the program instructions executable by the processor further cause the processor to:

truncates the expectation values of the observables that have a magnitude smaller than a threshold parameter to zero.

* * * * *